(12) United States Patent
Sawada et al.

(10) Patent No.: US 9,614,718 B2
(45) Date of Patent: Apr. 4, 2017

(54) COMMUNICATION SYSTEM FOR FAULT TOLERANCE IN CASCADE TOPOLOGY AND RING TOPOLOGY

(71) Applicant: FUJITSU LIMITED, Kawasaki-shi, Kanagawa (JP)

(72) Inventors: Junichi Sawada, Kawasaki (JP); Ryu Kobayashi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 14/497,702

(22) Filed: Sep. 26, 2014

(65) Prior Publication Data

US 2015/0009799 A1 Jan. 8, 2015

Related U.S. Application Data

(63) Continuation of application No. PCT/JP2012/058127, filed on Mar. 28, 2012.

(51) Int. Cl.
*H04L 1/00* (2006.01)
*H04L 12/26* (2006.01)
(Continued)

(52) U.S. Cl.
CPC ........ *H04L 41/0654* (2013.01); *H04L 12/437* (2013.01); *H04L 12/4637* (2013.01); *H04L 45/74* (2013.01)

(58) Field of Classification Search
CPC ............... H04L 41/0654; H04L 12/437; H04L 12/4637; H04L 45/74
See application file for complete search history.

(56) References Cited

U.S. PATENT DOCUMENTS

2001/0029546 A1* 10/2001 Motoyama .......... H04L 12/2602 709/235
2004/0170184 A1* 9/2004 Hashimoto ............. H04L 12/42 370/401

(Continued)

FOREIGN PATENT DOCUMENTS

| JP | 10-290252 | 10/1998 |
| JP | 2006-60489 | 3/2006 |
| JP | 2010-103788 | 5/2010 |

OTHER PUBLICATIONS

Japanese Office Action dated Dec. 1, 2015 in corresponding Japanese Patent Application No. 2014-507118.

(Continued)

*Primary Examiner* — Abdelnabi O Musa
(74) *Attorney, Agent, or Firm* — Staas & Halsey LLP

(57) ABSTRACT

A communication device is connected to an end of a first network of a cascade topology, and also to a second network. This communication device transmits a first list including information of communication devices, in the first network, that are destinations of transmission of frames through the first network, to an opposing communication device, in the second network, located at another end of the first network, and receives, from the opposing communication device, a second list including information of communication devices, in the first network, that are destinations of transmission of frames from the opposing communication device through the first network. The communication device determines in which of the first list and the second list a destination of a frame is included, and when the destination of the frame is included in the second list, transmits the frame to the second network.

11 Claims, 26 Drawing Sheets

(51) Int. Cl.
*H04L 12/24* (2006.01)
*H04L 12/437* (2006.01)
*H04L 12/46* (2006.01)
*H04L 12/741* (2013.01)

(56) References Cited

U.S. PATENT DOCUMENTS

| | | | | |
|---|---|---|---|---|
| 2007/0086355 | A1* | 4/2007 | Sawada | H04L 47/10 370/252 |
| 2007/0140248 | A1* | 6/2007 | Guo | H04L 12/413 370/392 |
| 2007/0242604 | A1* | 10/2007 | Takase | H04J 3/14 370/223 |
| 2010/0085969 | A1* | 4/2010 | Aoki | H04L 12/44 370/392 |
| 2010/0150162 | A1* | 6/2010 | Nakayama | H04L 12/437 370/400 |

OTHER PUBLICATIONS

International Search Report mailed May 15, 2012, in corresponding International Patent Application No. PCT/JP2012/058127.

* cited by examiner

CASCADE TOPOLOGY

RELATED ART

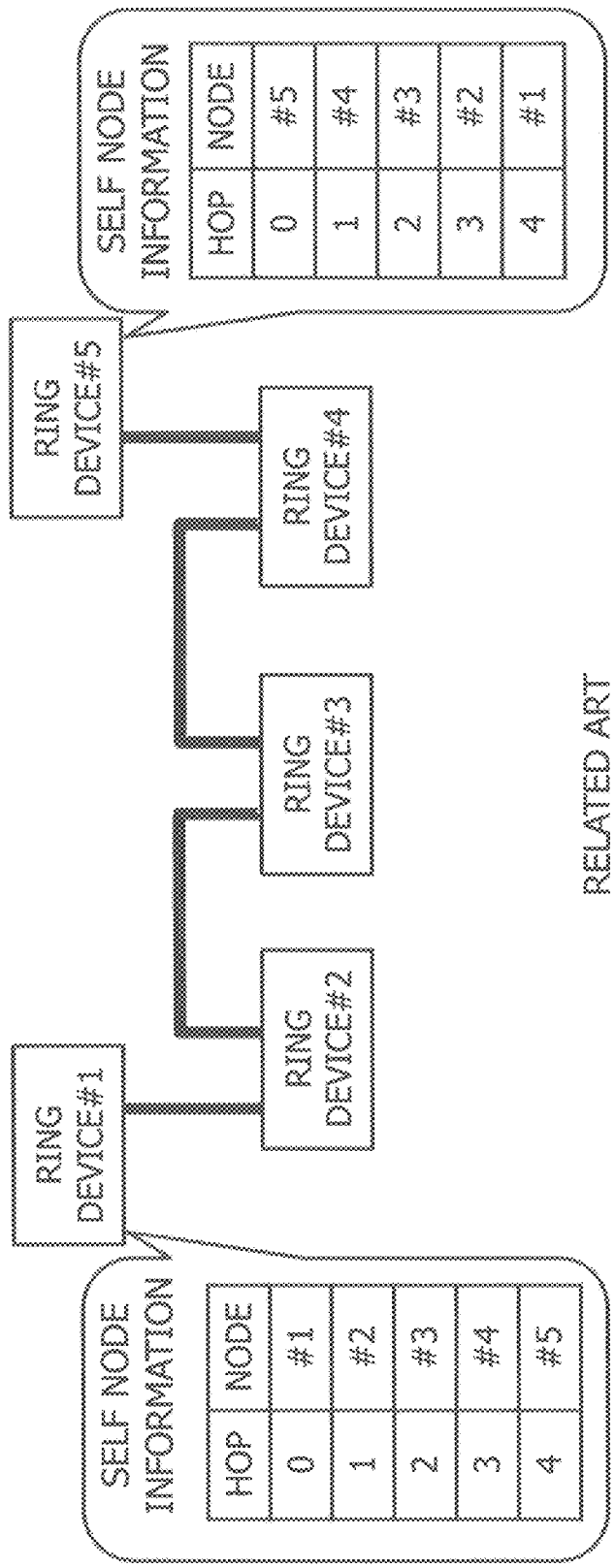

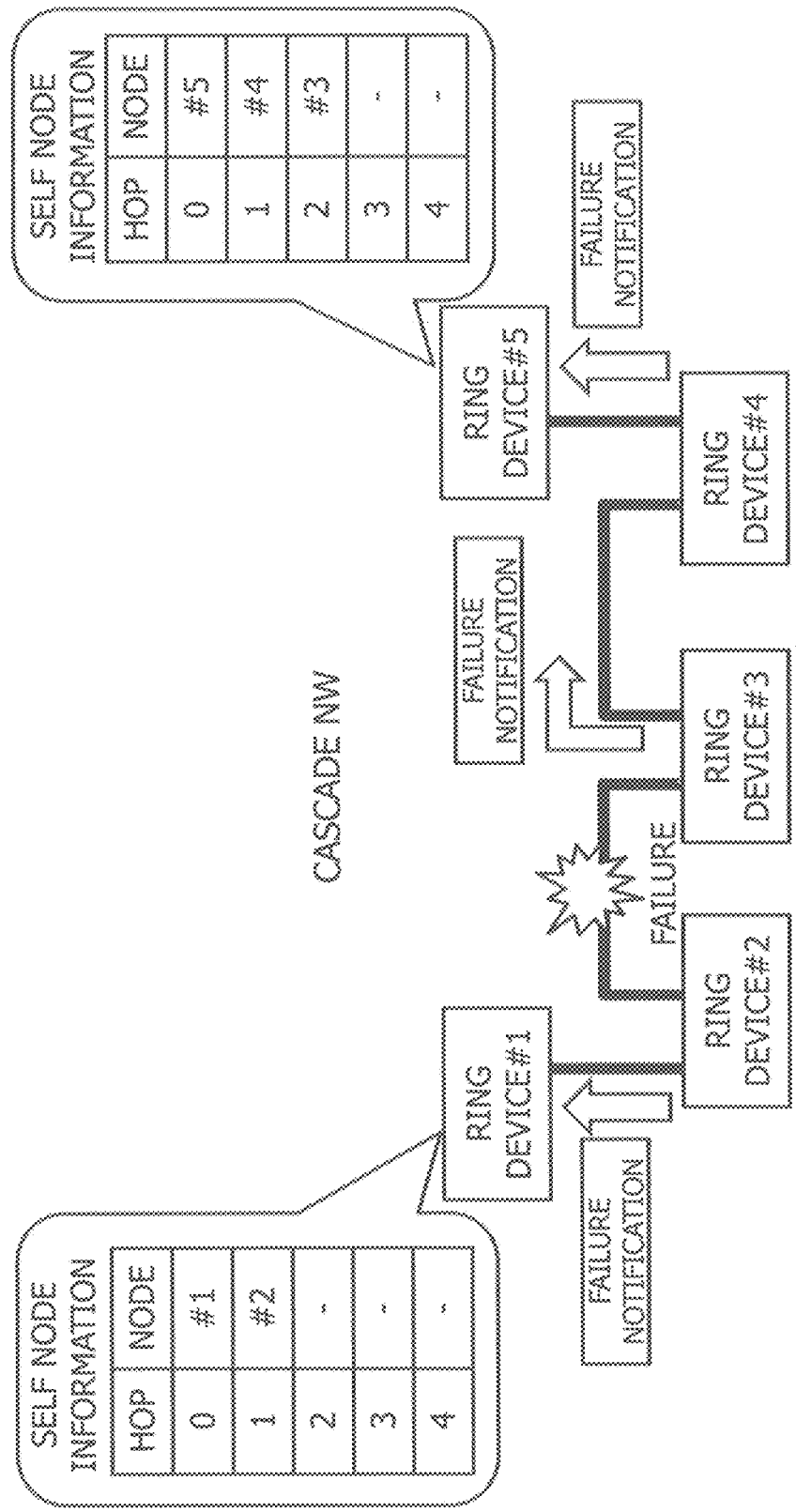

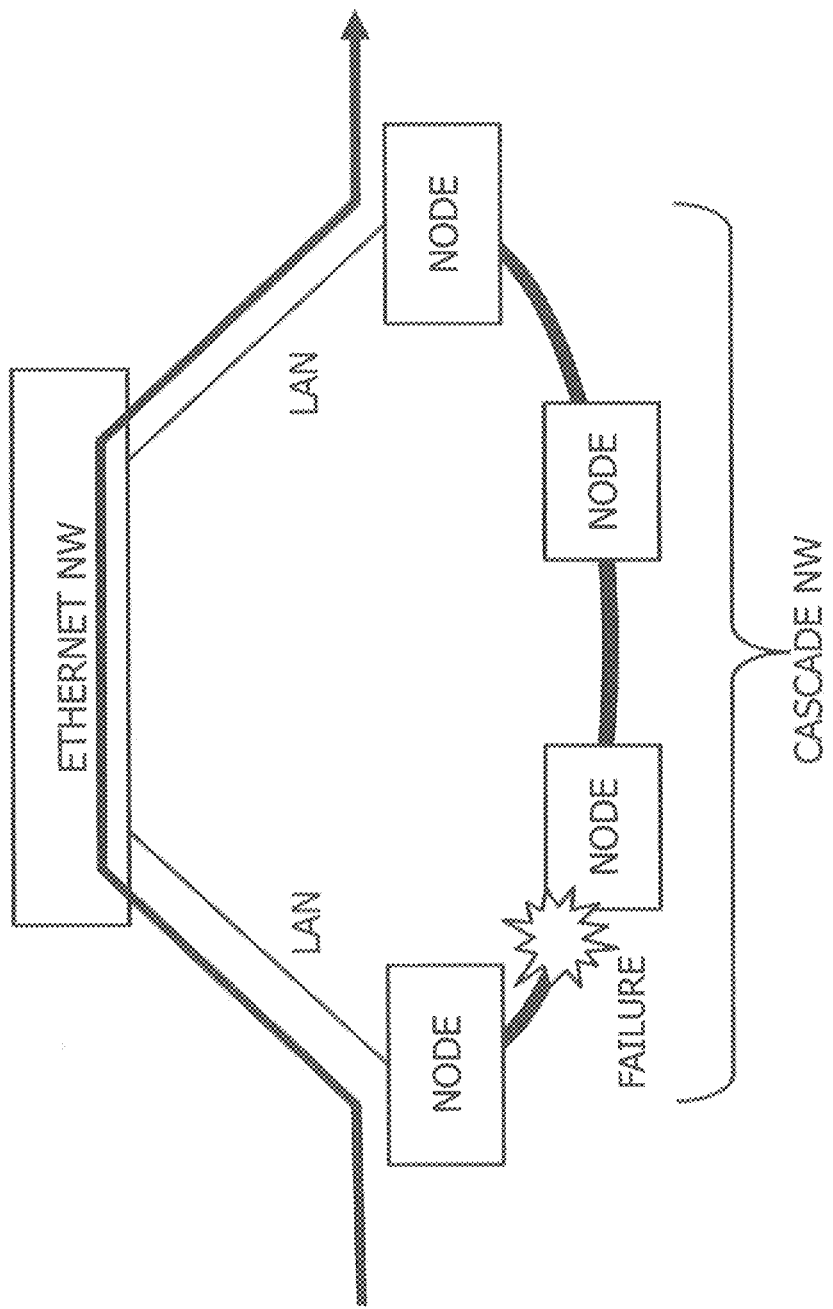

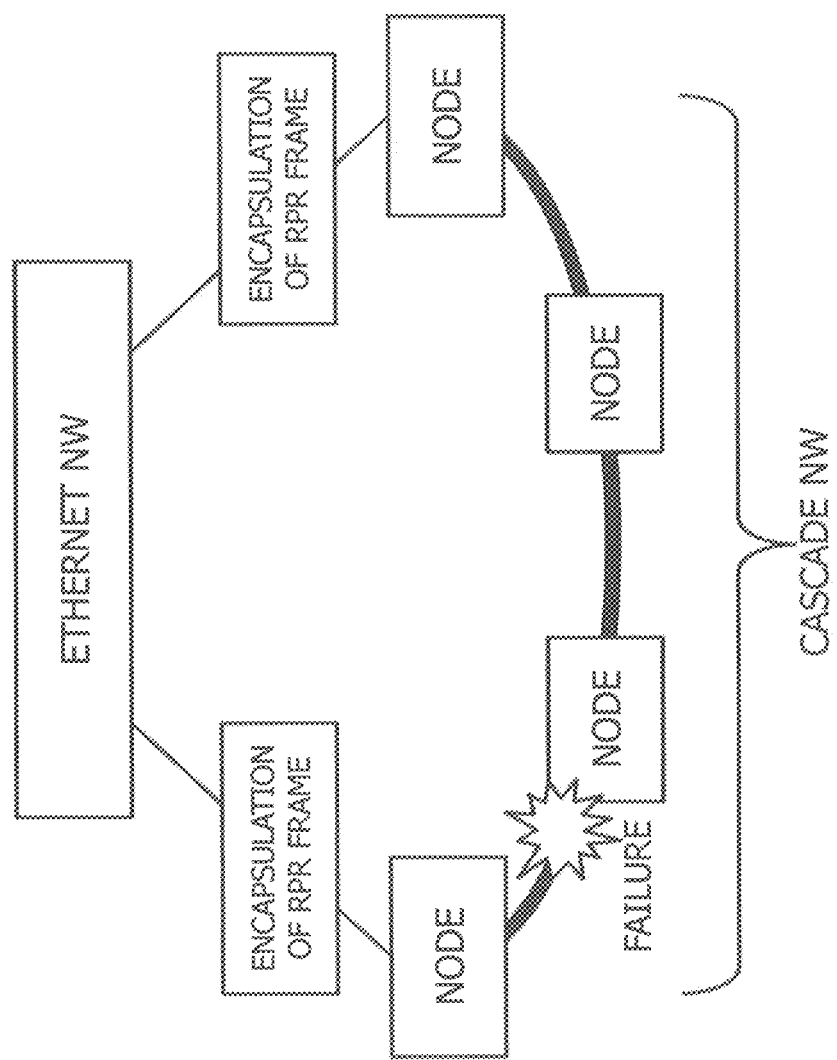

FRAME FORMAT WHERE RPR FRAME IS ENCAPSULATED BY ETHERNET AT BOUNDARY NODE

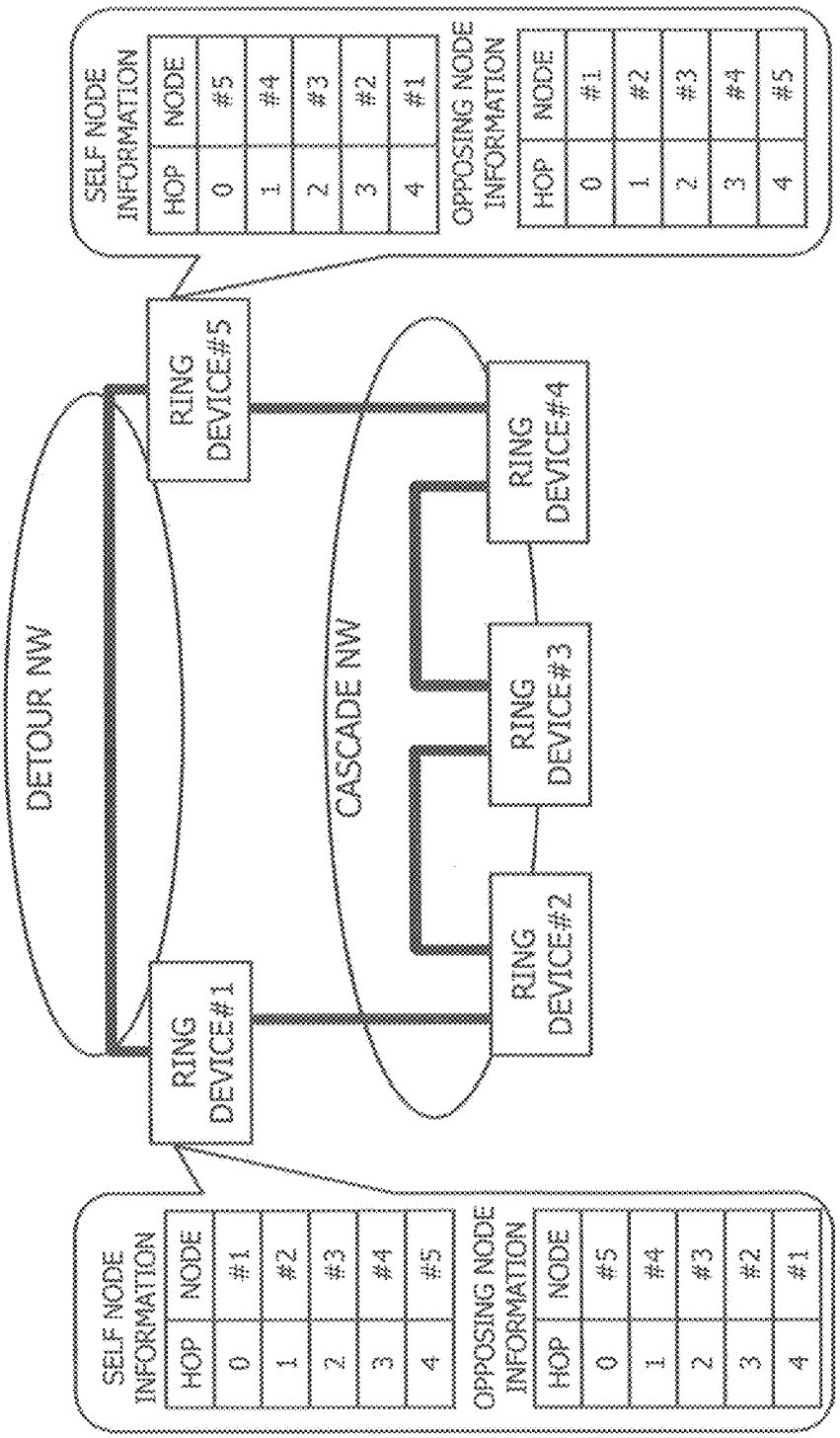

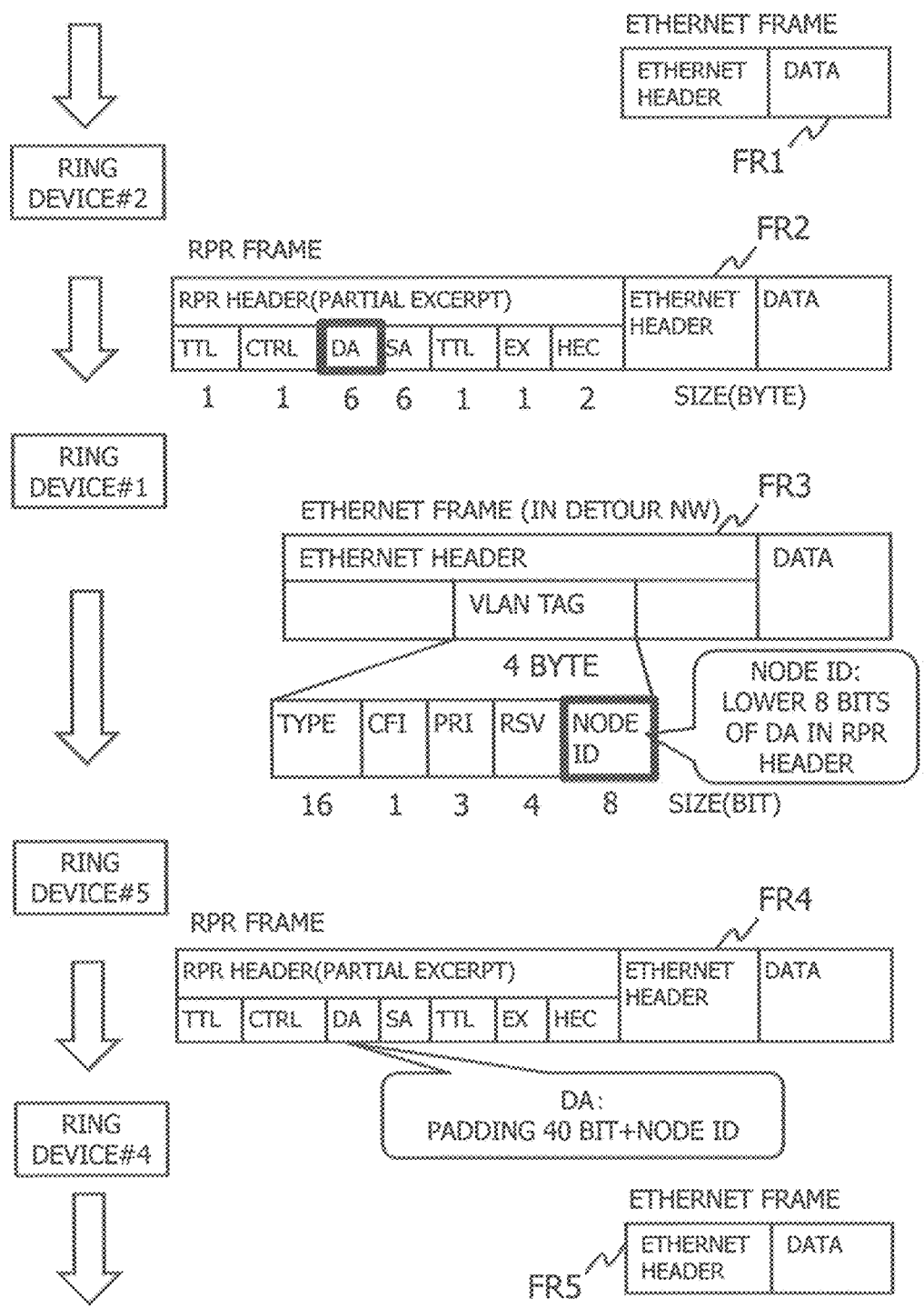

COMMUNICATION SYSTEM FOR FAULT TOLERANCE IN CASCADE TOPOLOGY AND RING TOPOLOGY

CROSS-REFERENCE TO RELATED APPLICATION

This application is a continuation application of International Application PCT/JP2012/058127, filed on Mar. 28, 2012, and designated the U.S., the entire contents of which are incorporated herein by reference.

FIELD

The present invention relates to a communication device in a cascade topology network, a communication method, and a communication program.

BACKGROUND

As a technique drawing attention as a backbone construction technique for the next generation IP network (NGN: Next Generation Network), there is RPR (Resilient Packet Ring). RPR is standardized as IEEE 802.17. RPR is a technique for efficiently using a high-speed line of 10 Gbit/sec on a per-frame basis. In IEEE 802.17, a ring topology and a cascade topology are defined as connection modes of nodes.

FIG. 1 is a diagram illustrating an example of the ring topology. The ring topology is a mode of circularly connecting nodes. With the ring topology, even if a failure occurs, communication is possible in the direction opposite to the failure, and the reliability is high. Accordingly, with the RPR ring topology, recovery within 50 ms of occurrence of a failure, which is an indication of availability of a communication service provided by a telecommunication carrier, may be achieved. However, due to the specifications of IEEE 802.17, there is a constraint that, in the case of constructing a ring topology, all the transmission paths on the ring have to be in accordance with RPR.

FIG. 2 is a diagram illustrating an example of the cascade topology. The cascade topology is a mode of serially connecting nodes. With the cascade topology, it is highly likely that the network becomes partitioned due to a transmission path failure at one portion, and communication becomes disabled.

PATENT DOCUMENT

[Patent document 1] Japanese Laid-open Patent Publication No 10-290252

FIG. 3A is a diagram illustrating an example of an RPR network of the cascade topology. In FIG. 3A, ring devices #1 to #5 construct the RPR network of the cascade topology. Each of the ring devices #1 to #5 transmits RPR control frames at regular intervals, learns the topology by control frames from other ring devices, and generates self node information. The self node information is information indicating the order of arrangement of nodes in the RPR network. Also, the self node information is generated for each interface that is connected to the RPR network. For example, the self node information includes the node ID of a ring device located in the interface direction and the number of hops from the self device.

In FIG. 3A, pieces of the self node information of the ring device #1 and the ring device #5 are illustrated. According to the self node information of the ring device #1 located at one end of the cascade topology in FIG. 3A, the ring device #1 (self device) is at hop 0, the ring device #2 is at a distance of 1 hop, . . . , and the ring device #5 is at a distance of 4 hops. At the time of transmitting an RPR frame, the ring device #1 and the ring device #5 each search the self node information for a destination node, and if the destination node is included in the self node information, transmit the RPR frame from an interface corresponding to the self node information. If the destination node is not included in the self node information, the frame is discarded. Additionally, the ring device #1 and the ring device #5 are nodes located at ends of the cascade topology, and each include an interface connected one RPR network, and thus, each hold one piece of self node information. However, since the ring devices #2 to #4 each include interfaces connected to two RPR networks, they include two pieces of self node information corresponding to respective interfaces. In the case of transmitting an RPR frame, the ring devices #2 to #4 each search the pieces of self node information corresponding to the interfaces for the destination node, and transmit the RPR frame from the interface corresponding to the self node information where the destination node is included. If the destination node is not included in either of the pieces of self node information, the frame is discarded.

FIG. 3B is a diagram illustrating an example of a case where a failure has occurred in the RPR network of the cascade topology illustrated in FIG. 3A. In FIG. 3B, a failure has occurred in the transmission path between the ring device #2 and the ring device #3. In this case, each of the ring device #2 and the ring #3 connected to the transmission path where a failure has occurred detects the occurrence of the failure, and transmits a failure notification to other ring devices. In FIG. 3B, the self node information of the ring device #1 and of the ring device #5 are illustrated.

For example, the ring device #1 receives the failure notification from the ring device #2. Then, since information of the ring devices #3, #4 and #5 located beyond the transmission path where the failure has occurred will not be received, information of the ring devices #3, #4 and #5 is deleted from the self node information of the ring device #1. Accordingly, since information of the ring devices #3, #4 and #5 is no longer included in the self node information, the ring device #1 may no longer transmit frames to the ring devices #3, #4 and #5.

Similarly, the ring device #5 receives the failure notification transmitted from the ring device #3. Since information of the ring devices #1 and #2 that are, when seen from the ring device #5, located beyond the transmission path where the failure has occurred will not be received, information of the ring devices #1 and #2 is deleted from the self node information of the ring device #5. Accordingly, since information of the ring devices #1 and #2 is no longer included in the self node information, the ring device #5 may no longer transmit frames to the ring devices #1 and #2.

Also, the ring device #2 may no longer transmit frames to the ring devices #3 to #5 because the self node information corresponding to the interface connected to the transmission path where the failure has occurred is lost. The ring device #3 may no longer transmit frames to the ring devices #1 and #2 because the self node information corresponding to the interface connected to the transmission path where the failure has occurred is lost. Since information of the ring devices #1 and #2 will no longer be received, information of the ring devices #1 and #2 is deleted from the self node information of the ring device #4, and the ring device #4 may no longer transmit frames to the ring devices #1 and #2.

In this manner, with the topology network, the network becomes partitioned due to occurrence of a failure.

In view of the problem mentioned above, it is conceivable, with respect to the cascade topology, to provide a detour path to cope with occurrence of a failure.

SUMMARY

An aspect of the present invention is a communication device connected to an end of a first network of a cascade topology, and also to a second network with a frame format different from the first network, the communication device including:

a transmission unit configured to transmit a first list including information of one or more communication devices, in the first network, that are one or more destinations of transmission of frames through the first network, to an opposing communication device, in the second network, located at another end of the first network and connected also to the second network;

a reception unit configured to receive, from the opposing communication device, a second list including information of one or more communication devices, in the first network, that is are one ore more destinations of transmission of frames from the opposing communication device through the first network;

a storage unit configured to store the first list and the second list;

a determination unit configured to determine in which of the first list and the second list a destination of a frame is included; and a frame transmission unit configured to transmit, when a destination of a frame received from the first network is included in the second list, the frame to the second network.

Another aspect of the present invention is a communication method that is performed by the communication device described above. Also, other aspects of the present invention may include a communication program for causing a computer to function as the communication device, and a computer-readable recording medium recording the communication program. A recording medium that may be read by a computer and the like refers to a recording medium that is capable of accumulating information such as data or a program electrically, magnetically, optically, mechanically, or chemically, and that may be read by a computer or the like.

The object and advantages of the invention will be realized and attained by means of the elements and combinations particularly pointed out in the claims.

It is to be understood that both the foregoing general description and the following detailed description are exemplary and explanatory only and are not restrictive of the invention.

BRIEF DESCRIPTION OF DRAWINGS

FIG. 3A is a diagram illustrating an example of an RPR network of the cascade topology;

FIG. 3B is a diagram illustrating an example of a case where a failure has occurred in the RPR network of the cascade topology illustrated in FIG. 3A;

FIG. 4 is a diagram illustrating a proposed design 1 of a detour path in the cascade topology;

FIG. 5A is a diagram illustrating a proposed design 2 of the detour path in the cascade topology;

FIG. 6A is a diagram for describing an outline of a communication system including a detour path according to a first embodiment;

FIG. 7B is a diagram illustrating an example of transition due to frame conversion in the communication system according to the first embodiment;

DESCRIPTION OF EMBODIMENTS

Hereinafter, embodiments of the present invention will be described with reference to the drawings. The structures of the embodiments below are merely examples, and the present invention is not restricted to the structures of the embodiments.

<Detour Path of Cascade Topology Using Ethernet Network>

FIG. 4 is a diagram illustrating a proposed design 1 of a detour path in a cascade topology. In the example illustrated in FIG. 4, nodes located at both ends of an RPR network of the cascade topology are connected by Ethernet, and a detour path is thereby constructed. A node that is located at an end of the RPR network of the cascade topology and that is located at the boundary of the RPR network and the Ethernet will hereinafter be referred to as a boundary node. Also, a cascade RPR network will be referred to also as a cascade NW.

However, the proposed design 1 has the following problem. For example, if networks of the boundary nodes on the LAN side are connected when a failure has occurred in a transmission path in the RPR network, an STP (Spanning Tree Protocol) is implemented in the LAN. Since implementation of the STP takes several seconds, the switching time at the time of occurrence of a failure in the proposed design 1 exceeds the switching time which is an indication of availability (50 ms or less). Also, for example, when passing through a detour path (Ethernet), a frame is not able to pass through in the format of RPR, and thus, an RPR header is removed from the frame, and the frame is made an original Ethernet frame. Thus, QoS information for the RPR network goes missing. An original Ethernet frame refers to an Ethernet frame that is transmitted from a terminal within a network (Ethernet) that is subordinate to a ring device. Thus, in the case where the frame reached the RPR network again through the detour path, appropriate priority control may not be performed in the RPR network.

FIG. 5A is a diagram illustrating a proposed design 2 of the detour path in the cascade topology. In the example illustrated in FIG. 5A, as in FIG. 4, boundary nodes of the RPR network of the cascade topology are connected by Ethernet, and a detour path is thereby constructed. According to the proposed design 2 illustrated in FIG. 5A, since a frame is to be transmitted to the detour path (Ethernet), the boundary node encapsulates an RPR frame by an Ethernet frame. By being encapsulated by Ethernet, the header of the RPR frame is maintained, and QoS information for the RPR network is prevented from going missing. However, there is the following problem.

Figure 1:
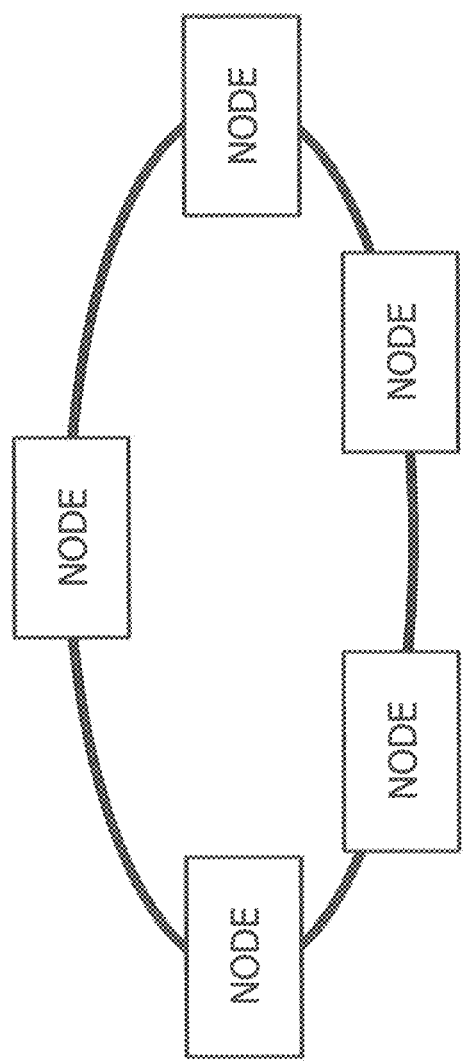
FIG. 1 is a diagram illustrating an example of a ring topology.
Figure 2:
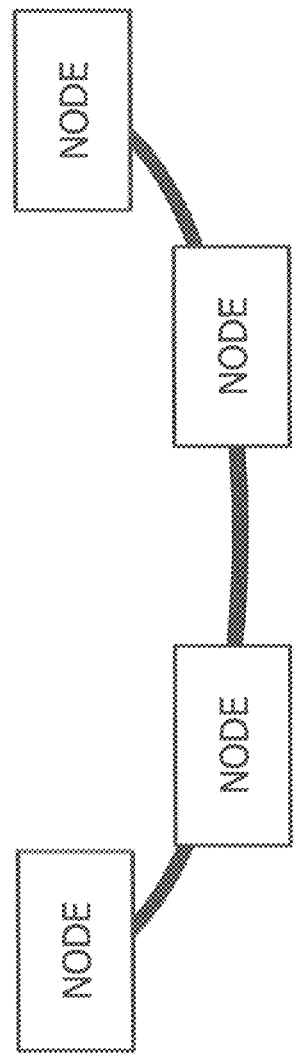
FIG. 2 is a diagram illustrating an example of a cascade topology.
Figure 5B:
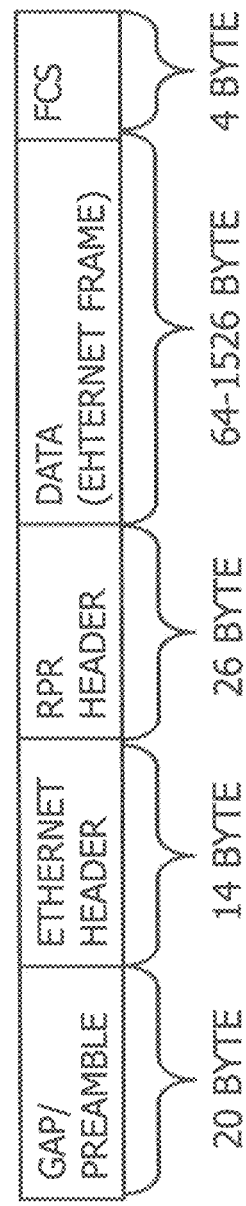
FIG. 5B is a diagram illustrating a format of an Ethernet frame where an RPR frame is encapsulated.

FIG. 5B is a diagram illustrating a format of an Ethernet frame where an RPR frame is encapsulated. Compared to a regular Ethernet frame, an Ethernet frame encapsulating an RPR frame is increased in size by the amount of an RPR header (26 bytes) and an Ethernet header for encapsulating the RPR frame (total 18 bytes). Accordingly, the frame transfer capacity in the detour path is reduced. For example, when encapsulating an RPR frame by an Ethernet frame at the time of transmitting an Ethernet frame of a minimum size (64 bytes), since the frame size is increased, the frame transfer capacity is reduced by about 80%. That is, in the case of the proposed design 2, the use band of the detour path is increased by the increase in the frame size due to encapsulation of an RPR frame by Ethernet.

First Embodiment

In a first embodiment, a communication method for maintaining a switching time (50 ms) which is an indication of availability, and preventing reduction in the frame transfer capacity of a detour network is provided.

FIG. 6A is a diagram for describing an outline of a communication system including a detour path according to the first embodiment. The communication system according to the first embodiment includes an RPR network of a cascade topology (a cascade NW in the drawing), and Ethernet as a detour path (a detour NW in the drawing). The ring devices #1 to #5 are connected to the RPR network, and construct the cascade topology. The ring device #1 and the ring device #5 (boundary nodes) are connected to the Ethernet using LAN interfaces.

According to the first embodiment, the ring devices #1 and #5, which are boundary nodes, include, in addition to the self node information, opposing node information. FIG. 6A illustrates the self node information and the opposing node information of the ring device #1 and the ring device #5. The opposing node information is a copy of the self node information held by an opposing node in the detour NW, that is, the boundary node at the other end of the cascade NW. Accordingly, in the example illustrated in FIG. 6A, the self node information of the ring device #1 and the opposing node information of the ring device #5 are the same. Also, in the example illustrated in FIG. 6A, the self node information of the ring device #5 and the opposing node information of the ring device #1 are the same.

For example, each boundary node acquires the opposing node information by regularly transmitting a copy of the self node information via the detour network and receiving a copy of the self node information from the opposing node. A copy of the self node information is transmitted by a control frame at an interval of 3 to 10 ms, for example. This opposing node information is, for each boundary node, information indicating the order of arrangement of nodes in the detour NW direction. On the other hand, the self node information is, for each boundary node, information indicating the arrangement of nodes in the cascade NW direction. By holding the opposing node information, a boundary node is able to grasp the arrangement in the opposite direction of the cascade NW, and a pseudo-ring topology may be formed.

Figure 6B:
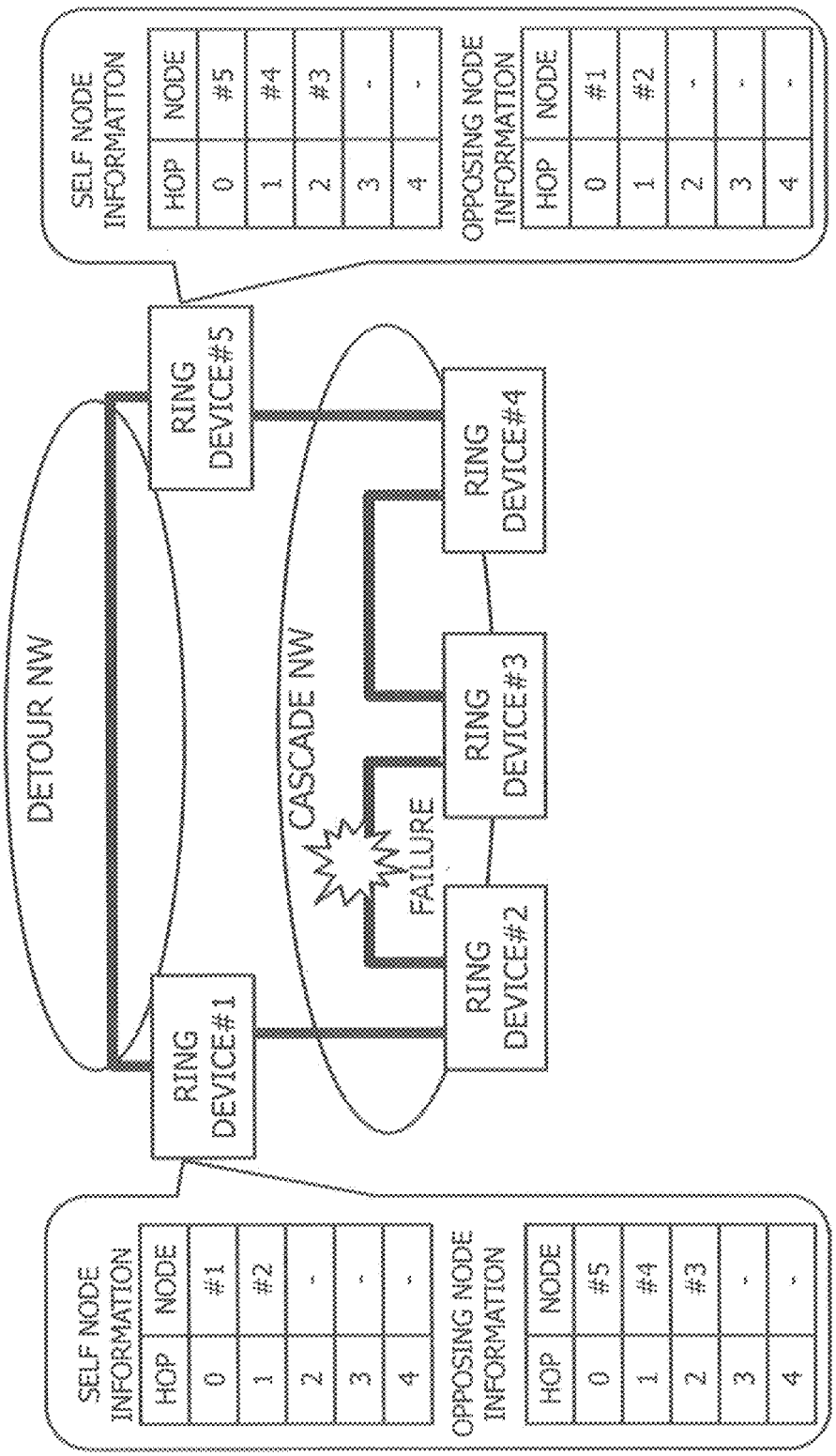
FIG. 6B is a diagram for describing an outline of the communication system where a failure has occurred in a cascade NW.

FIG. 6B is a diagram for describing an outline of the communication system where a failure has occurred in the cascade NW. FIG. 6B illustrates the self node information and the opposing node information of the ring device #1 and the ring device #5. For example, in the case where a failure occurs in a transmission path between the ring device #2 and the ring device #3 in the cascade NW, a failure notification is issued by the ring device #2 and the ring device #3 in the cascade NW by the function of the RPR. Then, information of the ring devices #3, #4 and #5 located, when seen from the ring device #1, beyond the portion where the failure has occurred is deleted from the self node information of the ring device #1, which is a boundary node. Also, information of the ring devices #1 and #2 located, when seen from the ring device #5, beyond the portion where the failure has occurred is deleted from the self node information of the ring device #5, which is the other boundary node. Since each boundary node transmits a copy of the self node information, the opposing node information of each boundary node is also updated. That is, the opposing node information of the ring device #1 is the same as the self node information of the ring device #5, and is information in which the ring devices #3, #4 and #5 are included. The opposing node information of the ring device #5 is the same as the self node information of the ring device #1, and is information in which the ring devices #1 and #2 are included. Therefore, a node not included in the self node information of a boundary node is included in the opposing node information, and the boundary node may grasp information of all the nodes in the communication system even when there is a failure.

For example, in FIG. 6B where a failure has occurred in the cascade NW, if a frame is to be transmitted from the ring device #1, which is a boundary node, to the ring device #3, the ring device #3 is not included in the self node information of the ring device #1, but is included in the opposing node information. The ring device #1 grasps presence of a node included in the opposing node information in the detour NW direction, and transmits the frame destined to ring device #3 to the detour NW. On the other hand, in FIG. 6B, in the case where the ring device #1 is to transmit a frame to the ring device #2, the ring device #2 is included in the self node information of the ring device #1. The ring device #1 grasps presence of a node included in the self node information in the cascade NW direction, and transmits the frame destined to the ring device #2 to the cascade NW.

As described above, to a ring device which is a boundary node, the self node information is information of a destination node for which a frame is to be transmitted through the cascade NW. Also, to the boundary node, the opposing node information is information of a destination node for which a frame is to be transmitted through the detour NW in the event of occurrence of a failure in the cascade NW. Accordingly, by the boundary node holding the opposing node information, which is a copy of the self node information of an opposing node in the detour NW, a pseudo-ring topology may be formed, and switching to the detour NW may be swiftly performed at the time of occurrence of a failure in the cascade NW.

Figure 7A:
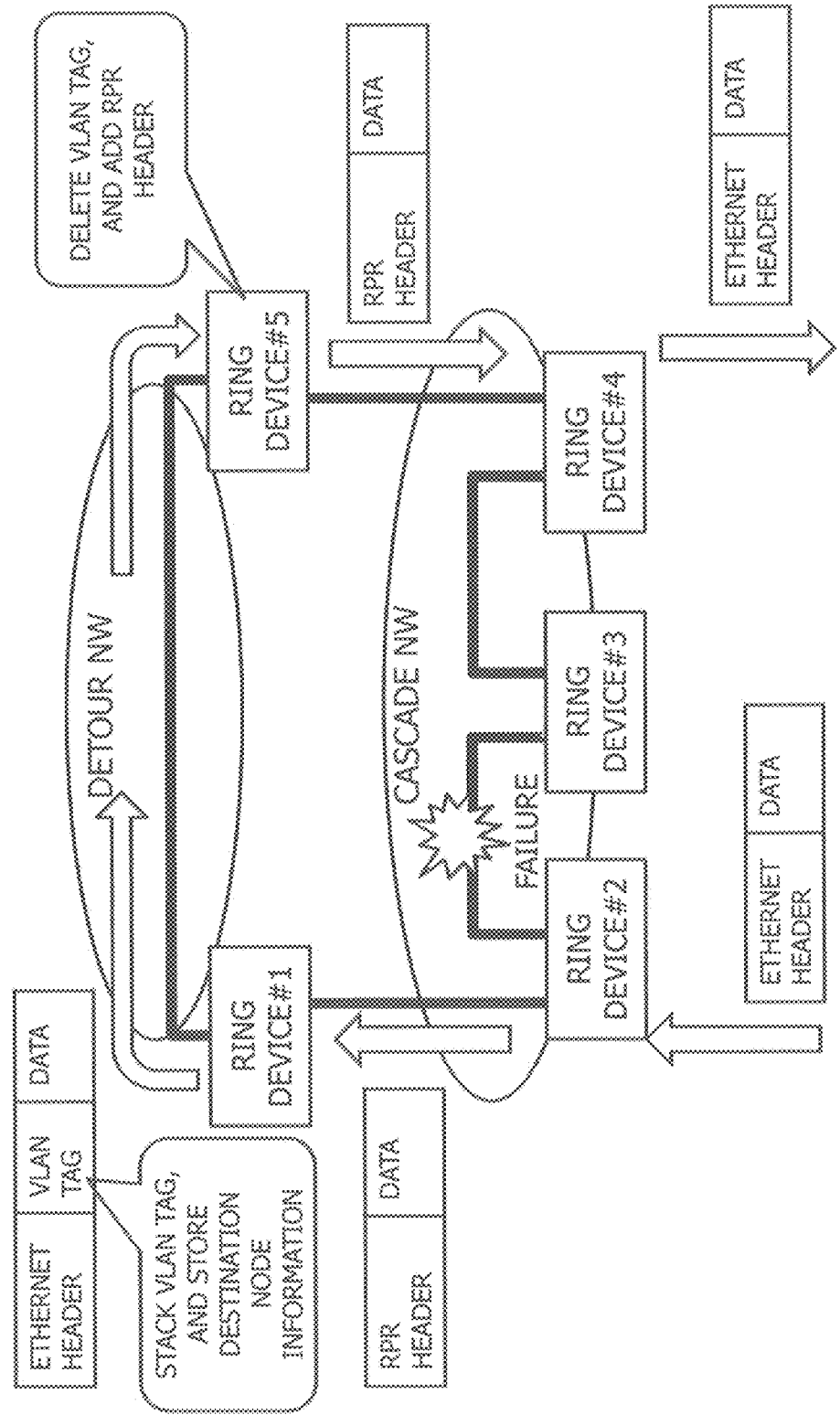
FIG. 7A is a diagram for describing an outline of frame conversion in the communication system according to the first embodiment.

FIG. 7A is a diagram for describing an outline of frame conversion in the communication system according to the first embodiment. The communication system illustrated in FIG. 7A is the same communication system as that in FIG. 6A. In the case of using the detour NW in the event of occurrence of a failure in the cascade NW, a boundary node stores destination node information included in the header of an RPR frame in a VLAN tag, and inserts the VLAN tag in a predetermined position of an Ethernet frame. Also, if the Ethernet frame is received from the detour NW, a boundary node extracts the destination node information from the VLAN tag of the received Ethernet frame, removes the VLAN tag, and adds an RPR header.

FIG. 7B is a diagram illustrating an example of transition due to frame conversion in the communication system according to the first embodiment. FIG. 7B illustrates an example of a case where, in the communication system illustrated in FIG. 7A, a frame transmitted from a terminal in a subordinate NW (Ethernet) of the ring device #2 follows the route of the ring device #2, the ring device #1, the detour network, the ring device #5, the ring device #4, and a terminal in a subordinate NW (Ethernet) of the ring device #4.

A frame FR1 to be transmitted from a terminal in the subordinate NW (Ethernet) of the ring device #2 is a regular Ethernet frame. An RPR header is added to this frame FR1 by the ring device #2, and the frame is encapsulated in an RPR frame FR2. A part of the RPR header is excerpted and illustrated as an RPR frame FR2 in FIG. 7B. Additionally, in the example illustrated in FIG. 7B, the destination of the Ethernet frame FR1 (original frame) is a terminal in the subordinate NW of the ring device #4, and the destination node ID in the RPR header is the ring device #4. Moreover, since each ring device recognizes, by the function of the RPR, the node ID of each ring device and the NW that is subordinate to each ring device, the ring device may acquire the destination node of the RPR from the destination NW of the Ethernet frame received from its subordinate NW. The RPR frame FR2 is transmitted by the ring device #2 to the ring device #1.

The frame FR2 is converted by the ring device #1 into an Ethernet frame FR3 including a VLAN tag upon arrival at the ring device #1, which is a boundary node. With respect to the frame FR3 in FIG. 7B, the format of the VLAN tag in the first embodiment is illustrated. Normally, a VLAN tag according to IEEE 802.1Q includes a 16-bit TYPE field, a 1-bit CFI field, a 3-bit priority field, and a 12-bit VLAN ID field. In the first embodiment, 8 bits of the field where a VLAN ID is normally stored are used as a field for storing a node ID (in the drawing, Node ID of the frame FR3). Also, the remaining 4 bits of the field which is normally used as the VLAN ID field are made a reserved field for future use (in the drawing, RSV field of the frame FR3). Additionally, normally, a value (0x8100) indicating a tagged frame according to IEEE 802.1Q is stored in the TYPE field, but in the first embodiment, a predetermined value indicating a frame obtained by converting an RPR frame is stored.

Additionally, according to the format specification of an RPR frame, 6 bytes are prepared for the field of the destination node ID and of the transmission source node ID (in the drawing, DA and SA of the frame FR2). However, according to the RPR, the maximum number of nodes is specified to be 255, and 8 bits (=256) are actually used for the node ID, and the lower 8 bits are, in many cases, used for the destination node ID and the transmission source node ID in the RPR frame. Accordingly, in the first embodiment, the lower 8 bits among the values stored in the destination node ID field (6 bytes) in the RPR header are stored in the VLAN tag as the destination node ID. However, this is not restrictive, and in the case where more than the lower 8 bits are used for the destination node ID, the size of the node ID field in the VLAN tag may be changed and be used (maximum 12 bits), for example.

The ring device #1 extracts the destination node ID (6 bytes) from the destination node ID field (in the drawing, DA of the frame FR2) of the header of the RPR frame FR2 received from the cascade NW. Next, the ring device #1 deletes the RPR header of the frame FR2, and inserts the VLAN tag in a position specified by the IEEE 802.1Q of the Ethernet frame. The lower 8 bits of the destination node ID extracted from the RPR frame FR2 are stored in the node ID field of the VLAN tag. The RPR frame FR2 is thereby converted into the Ethernet frame FR3. The ring device #1 transmits this frame FR3 to the detour NW. Additionally, the destination MAC address in the Ethernet header of the frame FR3 is the MAC address of the ring device #5, which is the opposing node. Information of the opposing node, such as the MAC address, the IP address and the like, is set in advance in the boundary node.

The frame FR3 reaches the ring device #5, which is the other boundary node, from the ring device #1, through the detour NW. The ring device #5 performs an inverse process of the ring device #1, and the frame FR3 is converted into an RPR frame FR4. Specifically, the ring device #5 extracts the lower 8 bits of the destination node ID from the node ID field of the VLAN tag of the frame FR3, adds padding of 40 bits thereto, and acquires the destination node ID. The ring device #5 deletes the VLAN tag from the Ethernet header of the frame FR3, adds an RPR header, and stores the acquired destination node ID to the destination node ID field in the RPR header. The Ethernet frame FR3 is thereby converted into the RPR frame FR4. The destination node of the frame FR4 is the ring device #4, and thus the ring device #5 transmits the frame FR4 to the cascade NW.

The frame FR4 has its RPR header deleted by the ring device #4 upon arrival at the ring device #4, and is made an Ethernet frame FR5, which is an original frame. Then, it is transmitted to the subordinate NW of the ring device #4 where the destination terminal is present.

Additionally, the transmission source node information of an RPR frame is rewritten by frame conversion between the RPR frame and an Ethernet frame that is performed by the ring device #1 and the ring device #5, which are boundary nodes. For example, the transmission source node ID of the frame FR2 in FIG. 7B (in the drawing, SA, 6 bytes) is the ring device #2, and the transmission source node ID of the frame FR4 is the ring device #5. In this manner, in the first embodiment, when a frame is transferred using the detour NW, the transmission source node of the RPR frame is changed during the transfer. However, this does not affect communication between terminals, and does not cause a problem.

As illustrated in FIGS. 7A and 7B, in the first embodiment, node information of the RPR network is given to the Ethernet frame by using the VLAN tag according to IEEE 802.1Q. Accordingly, even when an Ethernet network is used as the detour NW, the increase in size may be suppressed to 4 bytes compared to regular Ethernet, and reduction in the transfer capacity of the detour NW may be suppressed.

Additionally, as described with FIGS. 7A and 7B, in the first embodiment, RPR control frames to be broadcast by the ring devices also pass through the detour NW in the event of occurrence of a failure in the cascade NW. Thus, for example, the ring device #2 in FIG. 7A, which is not a boundary node, may acquire information (control frames) of the ring devices #3 to #5 from the side of the ring device #1 through the detour NW. The ring devices #3 to #5 will be included in the self node information corresponding to the interface on the side of the ring device #1, and the ring device #2 will grasp that the ring devices #3 to #5 are present in the direction of the ring device #1. Accordingly, at the time of transmitting frames to the ring devices #3 to #5, the ring device #2 transmits the frames in the direction where the ring device #1 is present. Accordingly, even when a failure has occurred in the cascade NW, a ring device which is not a boundary node may communicate with a ring device present in the communication path beyond the failure through the detour NW.

<Structure of Boundary Node>

Figure 8:
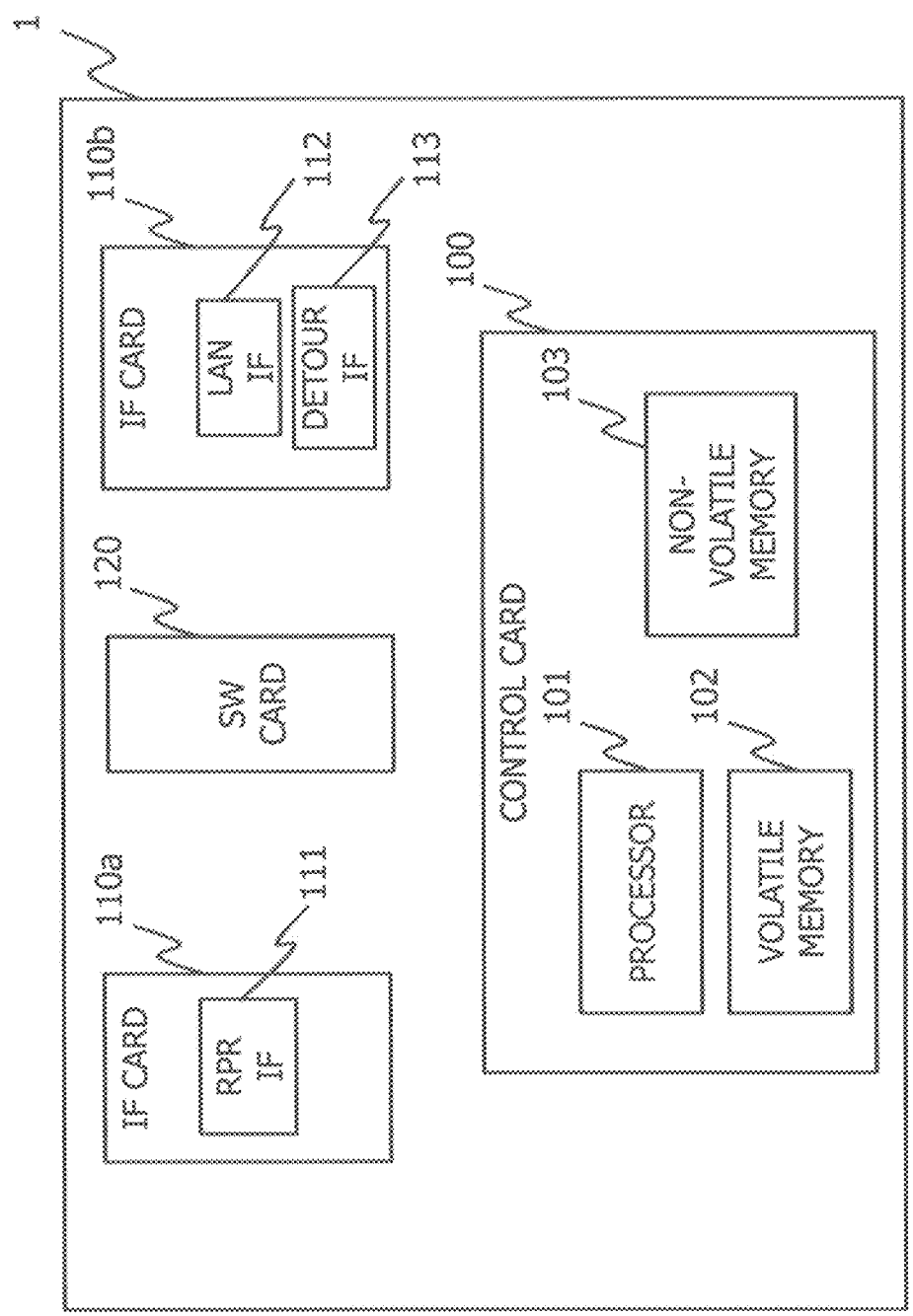
FIG. 8 is a diagram illustrating an example hardware structure of a ring device.

FIG. 8 is a diagram illustrating an example hardware structure of a ring device 1. The ring device 1 illustrated in FIG. 8 is a ring device which is a boundary node. The ring device 1 is a communication device of a router, a switch or the like, for example. The ring device 1 is an example of a "communication device". The ring device 1 includes a control card 100, an IF card 110a, an IF card 110b, and a SW card 120.

The IF card 110a includes an interface 111 to the RPR network, and performs processes at the data link layer and the physical layer of data transmitted to or received from the RPR network. The IF card 110b includes a LAN IF 112 and a detour IF 113 which are interfaces to the Ethernet network, and performs processes at the data link layer and the physical layer of data transmitted to or received from the Ethernet network. The LAN IF 112 is an interface that is connected to an Ethernet network that is subordinate to the ring device 1. The detour IF 113 is an interface that is connected to the detour NW (Ethernet network). The SW card 120 relays data between the IF cards.

The control card 100 controls the IF card 110a, the IF card 110b, and the SW card 120. Also, the control card 100 operates as a control plane, and performs software processing. The control card 100 includes a processor 101, a volatile memory 102, and a non-volatile memory 103.

The processor 101 is, for example, a CPU (Central Processing Unit), a DSP (Digital Signal Processor), or an NPU (Network Processing Unit). The processor 101 loads programs stored in the non-volatile memory 103 on the volatile memory 102, and executes the programs to thereby perform various processes. The number of processors 101 to be provided is not limited to one, and a plurality of processors 101 may be provided.

The volatile memory 102 provides, to the processor 101, a memory area where programs stored in the non-volatile memory 103 are to be loaded and a work area, or is used as a buffer. For example, the volatile memory 102 is a semiconductor memory such as an SRAM (Static Random Access Memory) or a DRAM (Dynamic Random Access Memory).

The non-volatile memory 103 stores various programs, or data to be used by the processor 101 at the time of execution of each program. An auxiliary storage device 105 includes a non-volatile memory such as a PROM (Programmable Read Only Memory), for example. Additionally, the hardware structure of the ring device 1 is not limited to that described above, and omission, replacement, or addition of structural elements is allowed as appropriate depending on the embodiment.

Figure 9:
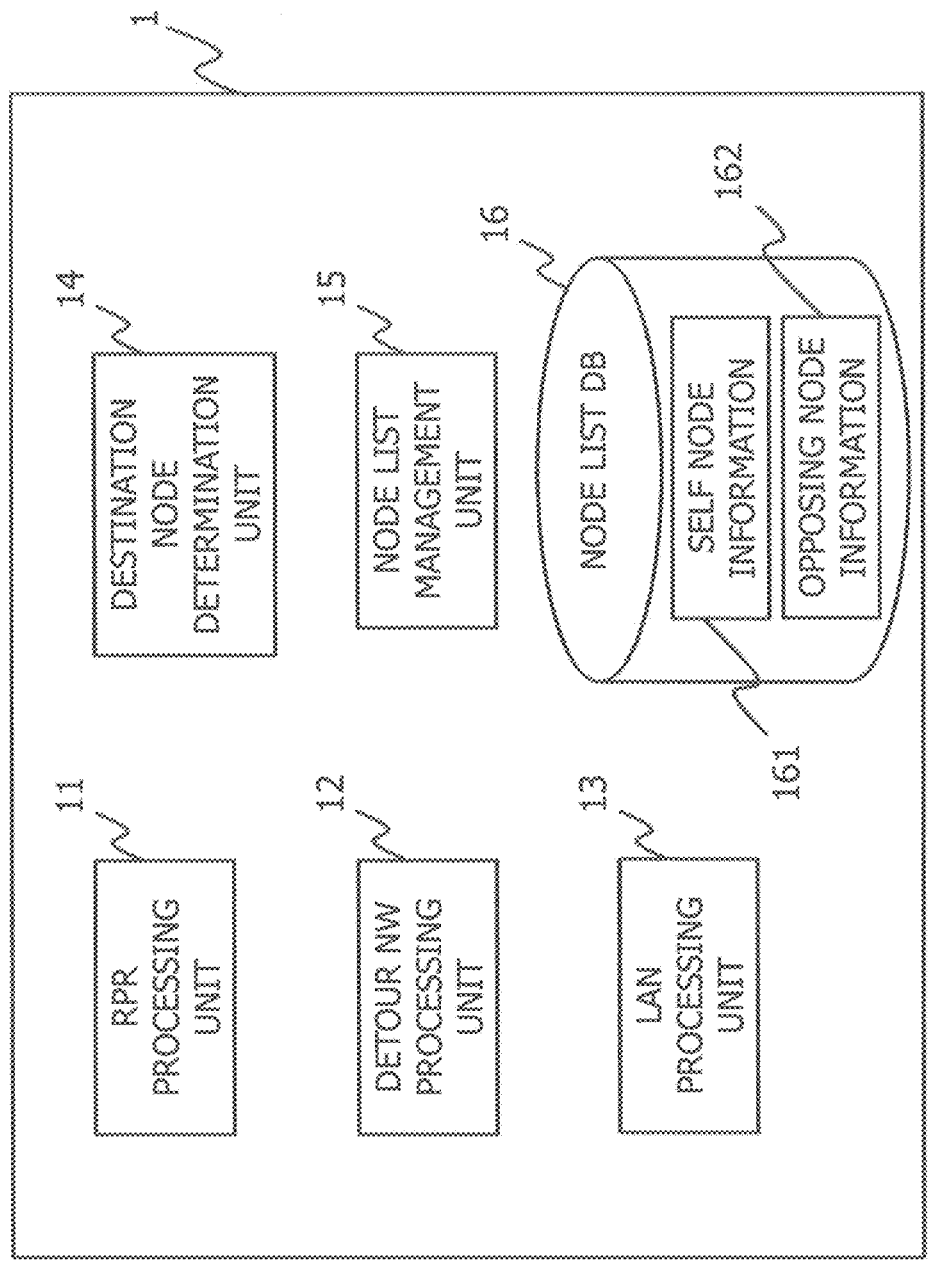
FIG. 9 is a diagram illustrating example functional blocks of the ring device.

FIG. 9 is a diagram illustrating example functional blocks of the ring device 1. The ring device 1 operates, by the processor 101 executing a communication program stored in the non-volatile memory 103, as an RPR processing unit 11, a detour NW processing unit 12, a LAN processing unit 13, a destination node determination unit 14, and a node list management unit 15. A node list database 16 (in the drawing, the node list DB) is created in the memory area of the volatile memory 12 through execution of the communication program by the processor 101. However, the above is not restrictive, and each functional block may be achieved by hardware, by an electronic circuit such as an FPGA (Field-Programmable Gate Array), an ASIC (Application Specific Integrated Circuit), or an LSI (Large Scale Integration).

The RPR processing unit 11 performs a process related to an RPR frame that is to be transmitted/received by the RPR IF 111 through the cascade NW (RPR). First, when an RPR frame is received by the RPR IF 111, the RPR processing unit 11 analyzes the RPR frame, and extracts the destination node ID. Also, the RPR processing unit 11 deletes the RPR header from the received frame. Next, the RPR processing unit 11 inquires of the destination node determination unit 14 whether or not the extracted destination node ID is included in the node list DB 16. Also, in the case of transmission of an RPR frame, the RPR processing unit 11 acquires the destination node ID from the destination node determination unit 14, gives the frame an RPR header, and transmits the RPR frame from the RPR IF 111. The RPR processing unit 11 is an example of a "second frame transmission unit".

The detour NW processing unit 12 operates in the event of occurrence of a failure in the cascade NW (RPR), and performs a process related to an Ethernet frame that is to be transmitted/received by the detour IF 113 through the detour NW (Ethernet). A VLAN tag is added to the Ethernet frame that is to be transmitted/received by the detour IF 113 (see FIG. 7B, the frame FR3). Accordingly, when the Ethernet frame is received by the detour IF 113, the detour NW processing unit 12 analyzes the VLAN tag, and extracts the node ID. Also, the detour NW processing unit 12 deletes the VLAN tag from the received frame. The detour NW processing unit 12 inquires of the destination node determination unit 14 whether or not the extracted node ID is included in the node list DB 16. Also, in the case where the Ethernet frame is to be transmitted from the detour IF 113, the detour NW processing unit 12 acquires the destination node ID from the destination node determination unit 14, and stores the node ID in the VLAN tag. The detour NW processing unit 12 generates an Ethernet frame by inserting the VLAN tag in a predetermined position in the header, and transmits the Ethernet frame from the detour IF 113. The detour NW processing unit 12 is an example of a "frame transmission unit".

The LAN processing unit 13 performs a process related to an Ethernet frame that is to be transmitted/received by the LAN IF 112 through a subordinate NW (Ethernet) of the ring device 1. When an Ethernet frame is received by the LAN IF 112, the LAN processing unit 13 analyzes the received Ethernet frame, and acquires the destination node having the destination NW of the Ethernet frame as a subordinate. Additionally, the association of the node ID of each ring device and its subordinate NW is acquired by the function of the RPR, for example, and is stored in the volatile memory 102. The LAN processing unit 13 inquires of the destination node determination unit 14 whether or not the acquired destination node is included in the node list DB 16. Also, in the case where a frame is to be transmitted to the subordinate network of the ring device 1, the LAN processing unit 13 transmits the frame from the LAN IF 112.

When an inquiry about whether or not a destination node is included in the node list DB 16 is received from the RPR processing unit 11, the detour NW processing unit 12, or the LAN processing unit 13, the destination node determination unit 14 searches through the node list DB 16. When the cascade NW (RPR network) is normal, the destination node determination unit 14 searches self node information 161 for the destination node. When there is a failure in the cascade NW (RPR network), the destination node determination unit 14 searches the self node information 161 and opposing node information 162 for the destination node.

If the destination node is included in the self node information 161, the destination node determination unit 14 determines transmission of the frame from the RPR IF 111. Accordingly, in this case, the destination node determination unit 14 instructs the RPR processing unit 11 to transmit the frame, and notifies of the destination node.

If the destination node is included in the opposing node information 162 where a failure has occurred in the cascade NW, the destination node determination unit 14 determines transmission of the frame from the detour IF 113. In this case, the destination node determination unit 14 instructs the detour NW processing unit 12 to transmit the frame, and notifies of the destination node.

If the destination node is the self device, the destination node determination unit 14 determines transmission of the frame from the LAN IF 112. In this case, the destination node determination unit 14 instructs the LAN processing unit 13 to transmit the frame.

If the destination node is not included in the node list DB 16, the destination node determination unit 14 determines that the frame is to be discarded, and discards the frame. The destination node determination unit 14 is an example of a "determination unit".

The node list management unit 15 manages the self node information 161 and the opposing node information 162 stored in the node list DB 16. The node list management unit 15 updates the self node information 161 when notified of information not included in the self node information by an RPR control frame, or according to the reception state of an RPR control frame. For example, when a control frame from a newly added ring device is received, the node list management unit 15 adds the information of the ring device in the self node information. Also, for example, the node list management unit 15 deletes, from the self node information, a ring device from which a control frame is not received for a predetermined period of time or longer. Moreover, for example, the node list management unit 15 deletes, from the self node information, a ring device from which a control frame is not received within a predetermined period of time (a period of time shorter than the predetermined period of time mentioned above) after reception of a failure occurrence notification. The node list management unit 15 updates the opposing node information by a copy of the self node information of an opposing node received from the opposing node at a regular interval. Additionally, in the first embodiment, at the time of occurrence of a failure, an RPR control frame transmitted from each ring device also passes through the detour NW, but the node list management unit 15 does not perform processing regarding an RPR control frame received through the detour NW (by the detour IF 113). Accordingly, the node list management unit 15 does not update the self node information based on an RPR control frame received from the detour NW (by the detour IF 113).

Furthermore, the node list management unit 15 transmits a copy of the self node information 161 to the opposing node at a regular interval. The copy of the self node information 161 is transmitted regardless of presence or absence of a failure in the cascade network, and is transmitted from the detour IF 113, through the detour NW. The copy of the self node information 161 is treated at the opposing node as the opposing node information. Additionally, the IP address, the MAC address and the like of the opposing node are set in advance in the ring device 1. Also, the regular interval is 3 to 10 ms, for example. The node list management unit 15 is an example of a "reception unit". Also, the node list management unit 15 is an example of a "transmission unit".

The node list DB 16 is a database for storing information of a node, present in the RPR network, which is grasped by the ring device 1. The node list DB 16 stores the self node information 161 and the opposing node information 162. The node list DB 16 is an example of a "storage unit".

The self node information 161 stores information of a destination node to which a frame is to be transmitted from the RPR IF 111. Specifically, for example, the self node information 161 associates the number of hops from the ring device 1 and a node ID, as illustrated in FIG. 6A. The self node information 161 is associated with the RPR IF 111, for example. The self node information 161 is an example of a "first list".

The opposing node information 162 is a copy of the self node information of an opposing node. The opposing node information 162 is used when there is a failure in the cascade NW (RPR network), and stores information of a destination node to which a frame is to be transmitted from the detour IF 113. The opposing node information 162 is associated with the detour IF 113, for example. The opposing node information 162 is an example of a "second list".

<Example Operation of Management of Self Node Information>

Figure 10:
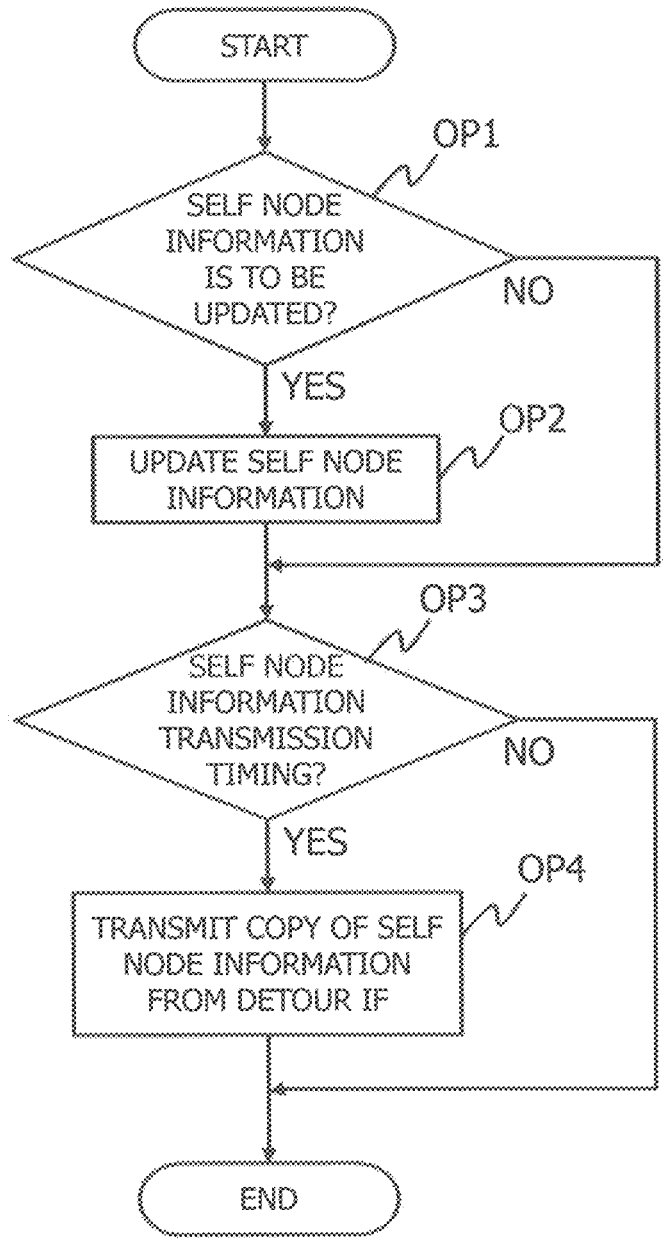
FIG. 10 is an example of a flow chart of a process related to management of self node information.

FIG. 10 is an example of a flow chart of a process related to management of the self node information. The flow chart illustrated in FIG. 10 is repeatedly performed while the ring device 1 is activated.

In OP1, the processor 101 determines whether or not to update the self node information 161. Whether or not the self node information is to be updated is determined based on the contents of a control frame, or a reception state of a control frame, for example. Here, the control frame is one that is received from the RPR network (by the RPR IF 111). If the self node information 161 is to be updated (OP1: Yes), the process proceeds to OP2. If the self node information 161 is not to be updated (OP1: No), the process proceeds to OP3.

In OP2, the processor 101 updates the self node information 161. The process next proceeds to OP3.

In OP3, the processor 101 determines whether or not it is the transmission timing for a copy of the self node information 161. If it is the transmission timing for a copy of the self node information (OP3: Yes), the process proceeds to OP4. If it is not the transmission timing for a copy of the self node information (OP3: No), the process illustrated in FIG. 10 is ended, and is repeated. The transmission timing for a copy of the self node information 161 is at an interval of 3 ms to 10 ms, for example.

In OP4, since it is the transmission timing for a copy of the self node information 161, the processor 101 transmits a copy of the self node information 161 stored in the node list DB 16 from the detour IF 113 to the opposing node. Then, the process illustrated in FIG. 10 is ended, and is repeated.

The processes of OP1 to OP4 correspond to a part of the processing by the node list management unit 15. Also, transmission of a copy of the self node information 161 from the detour IF 113 in OP4 corresponds a part of the processing by the detour NW processing unit 12.

<Frame Transfer Process at the Time of Occurrence of Failure in Cascade NW>

Figure 11:
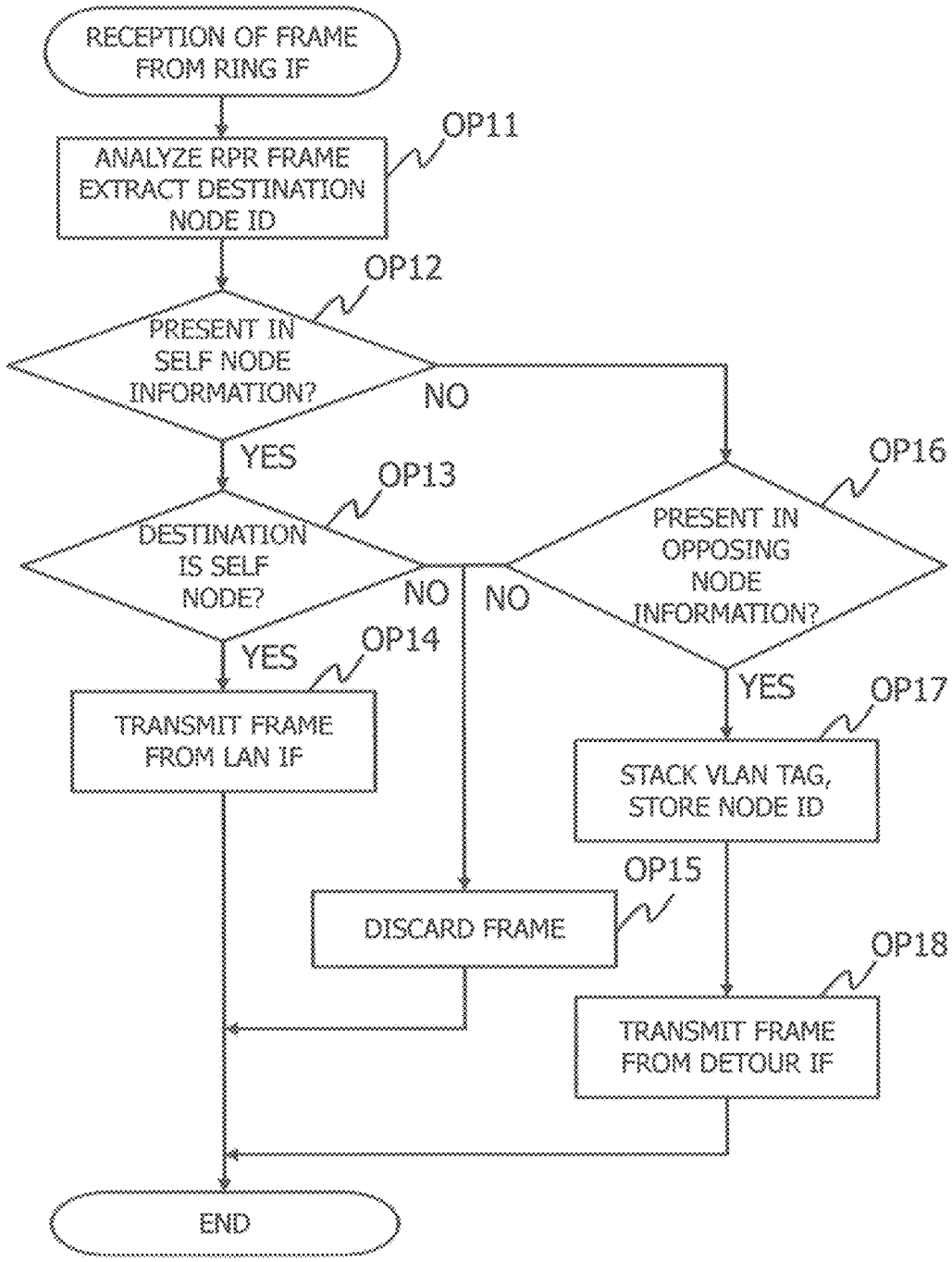
FIG. 11 is an example of a flow chart of a frame transfer process for a case where a frame is received by an RPR IF where there is occurrence of a failure in a cascade NW.
Figure 12:
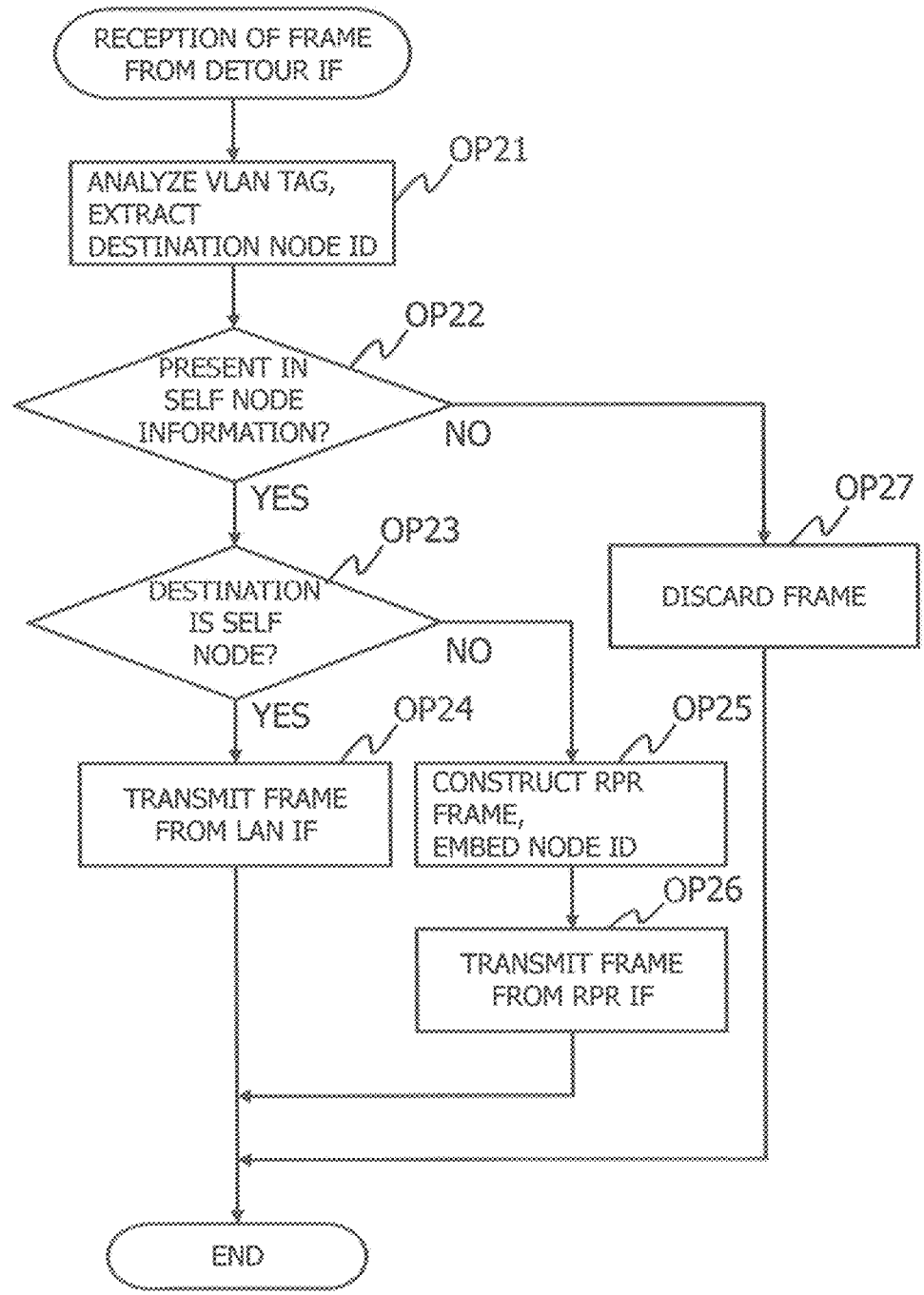
FIG. 12 is an example of a flow chart of a frame transfer process for a case where a frame is received by a detour IF where there is occurrence of a failure in a cascade NW.
Figure 13:
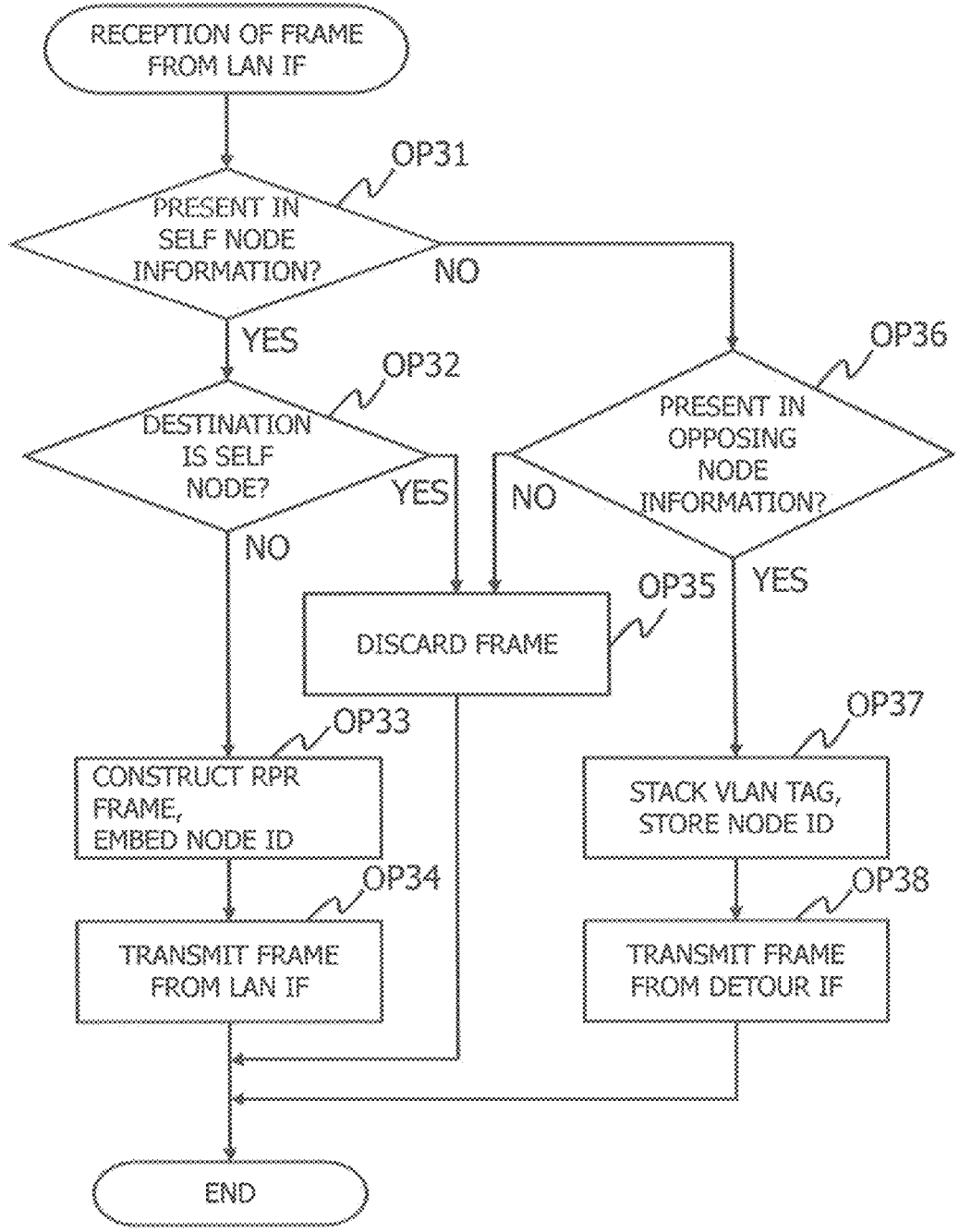
FIG. 13 is an example of a flow chart of a frame transfer process for a case where a frame is received by a LAN IF where there is occurrence of a failure in a cascade NW.

FIGS. 11, 12 and 13 are each an example of a flow chart of a frame transfer process where there is occurrence of a failure in the cascade NW (RPR network).

FIG. 11 is an example of a flow chart of a frame transfer process for a case where a frame is received by the RPR IF 111 where there is occurrence of a failure in the cascade NW. The flow chart illustrated in FIG. 11 is started when a frame is received by the RPR IF 111 where there is occurrence of a failure in the cascade NW.

In OP11, the processor 101 analyzes the RPR frame, and extracts the destination node ID from the RPR header. Also, the processor 101 deletes the RPR header from the received frame. Then, the process proceeds to OP12.

In OP12, the processor 101 determines whether or not there is the extracted destination node ID in the self node information 161. If there is the destination node ID in the self node information 161 (OP12: Yes), the process proceeds to OP13. If the destination node ID is not included in the self node information 161 (OP12: No), the process proceeds to OP16.

In OP13, the processor 101 determines whether or not the destination node ID indicates the node ID of the self node. For example, the self node is registered in the self node information 161 with the number of hops 0. If the destination node ID is the node ID of the self node (OP13: Yes), the processor 101 determines transmission of the frame from the LAN IF 112, and the process proceeds to OP14. If the destination node ID is not the node ID of the self node (OP13: No), it is indicated that the destination node ID is the node ID of another ring device included in the self node information 161. However, in this case, the frame received by the RPR IF 111 is to be transmitted again to the RPR IF 111, and thus the process proceeds to OP15, and the frame is discarded.

In OP14, the processor 101 transmits the frame from the LAN IF 112. Then, the process illustrated in FIG. 11 is ended.

In OP16, the processor 101 determines whether or not destination node ID extracted in OP11 is included in the opposing node information 162. If the destination node ID is included in the opposing node information 162 (OP16: Yes), the processor 101 determines transmission of the frame from the detour IF 113 because the destination ID is included in the opposing node information 162, and the process proceeds to OP17. If the destination node ID is not included in the opposing node information 162 (OP16: No), because the destination node ID is not included in either of the self node information 161 and the opposing node information 162, the process proceeds to OP15, and the processor 101 discards the frame.

In OP17, the processor 101 stores the lower 8 bits of the destination node ID in a VLAN tag, and inserts the VLAN tag in the Ethernet header of the received frame. Then, the process proceeds to OP18, and the processor 101 transmits the frame from the detour IF 113. Then, the process illustrated in FIG. 11 is ended.

The process in OP11 corresponds to a part of the processing by the RPR processing unit 11. The processes in OP12, OP13, OP15, and OP16 correspond to a part of the processing by the destination node determination unit 14. The process in OP14 corresponds to a part of the processing by the LAN processing unit 13. The processes in OP17 and OP18 correspond to a part of the processing by the detour NW processing unit 12.

FIG. 12 is an example of a flow chart of a frame transfer process for a case where a frame is received by the detour IF 113 where there is occurrence of a failure in the cascade NW. The flow chart illustrated in FIG. 12 is started when a frame is received by the detour IF 113 where there is occurrence of a failure in the cascade NW. Additionally, the frame to be received by the detour IF 113 is an Ethernet frame including a VLAN tag.

In OP21, the processor 101 analyzes the Ethernet frame, and extracts an 8-bit node ID from the VLAN tag. Also, the processor 101 deletes the VLAN tag from the Ethernet frame. Then, the process proceeds to OP22.

In OP22, the processor 101 determines whether or not the extracted node ID is included in the self node information 161. If the extracted node ID is included in the self node information 161 (OP22: Yes), the process proceeds to OP23. If the destination node ID is not included in the self node information 161 (OP22: No), the process proceeds to OP27.

In OP23, the processor 101 determines whether or not the extracted node ID indicates the node ID of the self node. If the extracted node ID is the node ID of the self node (OP23: Yes), the processor 101 determines transmission of the frame from the LAN IF 112, and the process proceeds to OP24. If the extracted node ID is not the node ID of the self node (OP23: No), the processor 101 determines transmission of the frame from the RPR IF 111, and the process proceeds to OP25.

In OP24, the processor 101 transmits the frame from the LAN IF 112. Then, the process illustrated in FIG. 12 is ended.

In OP25, the processor 101 performs padding on the node ID extracted in OP21 and stores the same in the field of the destination node ID in the RPR header, and generates an RPR frame by adding the RPR header (see FIG. 7B, the frame FR4). Then, the process proceeds to OP26, and the processor 101 transmits the RPR frame from the RPR IF 111 to the RPR network. Then, the process illustrated in FIG. 12 is ended.

In OP27, the processor 101 discards the frame. In the case where the destination node of the frame received by the detour IF 113 is not included in the self node information 161, even if it is included in the opposing node information 162, the same frame is to be transmitted to the detour NW again, and thus the frame is discarded. Then, the process illustrated in FIG. 12 is ended.

The process in OP21 corresponds to a part of the processing by the detour NW processing unit 12. The processes in OP22, OP23, and OP27 correspond to a part of the processing by the destination node determination unit 14. The process in OP24 corresponds to a part of the processing by the LAN processing unit 13. The processes in OP25 and OP26 correspond to a part of the processing by the RPR processing unit 11.

FIG. 13 is an example of a flow chart of a frame transfer process for a case where a frame is received by the LAN IF 112 where there is occurrence of a failure in the cascade NW. The flow chart illustrated in FIG. 13 is started when a frame is received by the LAN IF 112 where there is occurrence of a failure in the cascade NW.

In OP31, the processor 101 acquires the destination node ID that the destination NW of the received Ethernet frame is subordinate to, and determines whether or not the destination node ID is included in the self node information 161. If the destination node ID is included in the self node information 161 (OP31: Yes), the process proceeds to OP32. If the destination node ID is not included in the self node information 161 (OP31: No), the process proceeds to OP36.

In OP32, the processor 101 determines whether or not the destination node ID indicates the node ID of the self node. If the destination node ID is the node ID of the self node (OP32: Yes), the same frame is to be transmitted again from the LAN IF 112, and thus the process proceeds to OP35, and the processor 101 discards the frame. If the destination node ID is not the node ID of the self node (OP32: No), the processor 101 determines transmission of the frame from the RPR IF 111, and the process proceeds to OP33.

In OP33, the processor 101 stores the destination node ID in the destination node ID field in the RPR header, and generates an RPR frame by adding the RPR header (see FIG. 7B, the frames FR1, FR2). Next, the process proceeds to OP34, and the processor 101 transmits the RPR frame from the RPR IF 111 to the RPR network. Then, the process illustrated in FIG. 13 is ended.

In OP36, the processor 101 determines whether or not the destination node ID is included in the opposing node information 162. If the destination node ID is included in the opposing node information 162 (OP36: Yes), the processor 101 determines transmission of the frame from the detour IF 113 because the destination node ID is included in the opposing node information 162, and the process proceeds to OP37. If the destination node ID is not included in the opposing node information 162 (OP36: No), since the destination node ID is not included in either of the self node information 161 and the opposing node information 162, the process proceeds to OP35, and the processor 101 discards the frame.

In OP37, the processor 101 stores the lower 8 bits of the destination node ID in a VLAN tag, and inserts the VLAN tag in a predetermined position of the Ethernet header. Then, the process proceeds to OP38, and the processor 101 transmits the frame from the detour IF 113. Then, the process illustrated in FIG. 13 is ended.

The process of acquiring the destination node ID in OP31 corresponds to a part of the processing by the LAN processing unit 13. The processes in OP31, OP32, OP35, and OP36 correspond to a part of the processing by the destination node determination unit 14. The processes in OP33 and OP34 correspond to a part of the processing by the RPR processing unit 11. The OP37 and OP38 correspond to a part of the processing by the detour NW processing unit 12.

Additionally, in FIGS. 10 to 13, descriptions are given assuming that the functional blocks illustrated in FIG. 9 are achieved by execution of the communication program by the processor 101. However, this is not restrictive, and in the case where the functional blocks illustrated in FIG. 9 are to be achieved by hardware, each process is achieved by corresponding hardware.

In FIGS. 11 to 13, processes at the time of occurrence of a failure are described, but when the cascade NW is recovered from failure, the normal process is resumed. That is, the opposing node information will not be used for the search for a destination node. Recovery from a failure may be detected by receiving a control frame from the cascade NW and having the self node information updated, for example. For example, the recovery of the cascade NW may be determined when the nodes in the self node information and the opposing node information match.

<Effect of First Embodiment>

In the first embodiment, a ring device which is a boundary node of the cascade NW holds the self node information of the opposing node (the opposing node information). The opposing node information indicates information of a destination node through the detour NW (Ethernet). Thus, even if a failure occurs in the cascade NW, the boundary node may be able to grasp information of each node in the cascade NW. Also, if a failure occurs in the cascade NW, a frame may be transmitted to a destination node included in the opposing node information by using the detour NW, and disconnection of communication may be prevented. Also, at the time of occurrence of a failure in the cascade NW, switching is performed to the detour NW by using the opposing node information, and the switching time (50 ms or less) which is an indication of availability may be maintained. Moreover, with the RPR network of the ring topology, there is a constraint that all the transmission paths on the ring have to be in accordance with RPR, but according to the first embodiment, a pseudo-ring may be formed by using a network of a different type from RPR.

Also, according to the first embodiment, at the time of transferring a frame from the RPR network to the detour NW by the boundary node, the destination information of RPR is stored in a VLAN tag, and the VLAN tag is inserted in an Ethernet frame. Accordingly, the frame may be transmitted to the detour NW while maintaining the destination information of RPR. Moreover, since the size is increased from a normal Ethernet frame by just 4 bytes of the VLAN tag, band consumption in the detour NW may be suppressed.

<Example Application of First Embodiment>

Figure 14:
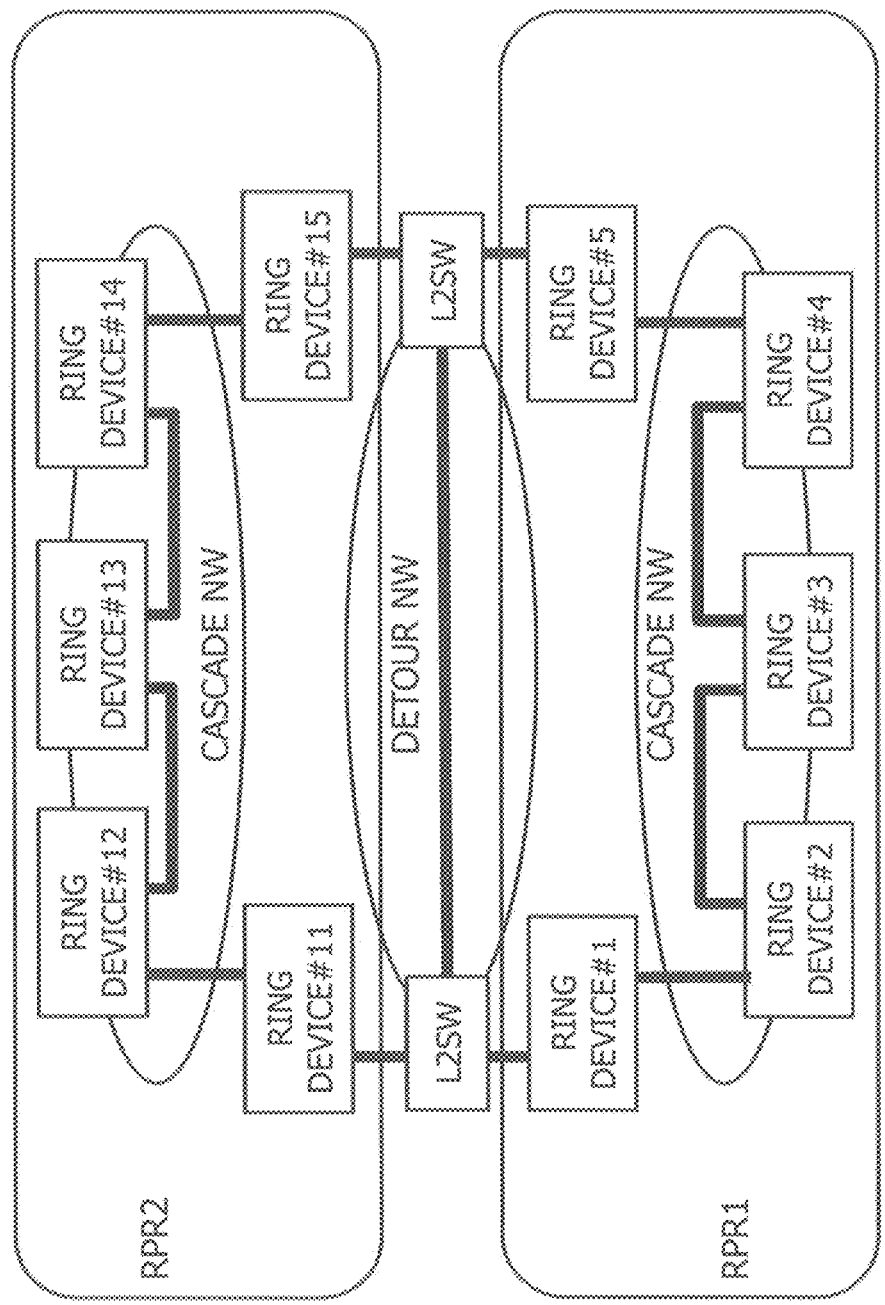
FIG. 14 is an example where a detour NW is shared by two RPR networks of an RPR1 and an RPR2.

FIG. 14 is a diagram illustrating an example application of the first embodiment. The example illustrated in FIG. 14 is an example where the detour NW is shared by two RPR networks of an RPR1 and an RPR2. In the detour NW, ring devices #1 and #5 which are boundary nodes of the RPR1 and ring devices #11 and #15 which are boundary nodes of the RPR2 are connected through layer 2 switches, respectively.

When the RPR network is normal, not many frames pass through the detour NW (for example, the opposing node information), and the total bandwidths of the two RPR networks, i.e. the RPR1 and the RPR2, do not have to be prepared in the detour NW, and merely the bandwidth of one RPR has to be prepared. By sharing the detour NW by a plurality of cascade NWs, the bandwidth may be effectively used. According to the communication device, the communication method, and the communication program disclosed herein, a detour path through a second network different from a first network of a cascade topology may be provided to the first network.

Second Embodiment

According to a second embodiment, at the time of transferring a frame to a detour NW (Ethernet), a boundary node has QoS information of a cascade NW stored in the header of an Ethernet frame, in addition to the destination information of the cascade NW (RPR). Accordingly, loss of the QoS information of the cascade NW due to passing through the detour NW may be prevented. Description of the second embodiment the same as that of the first embodiment will be omitted. Additionally, also in the second embodiment, the structure of the communication system assumes those of FIGS. 6A and 7A, as in the first embodiment.

Figure 15:
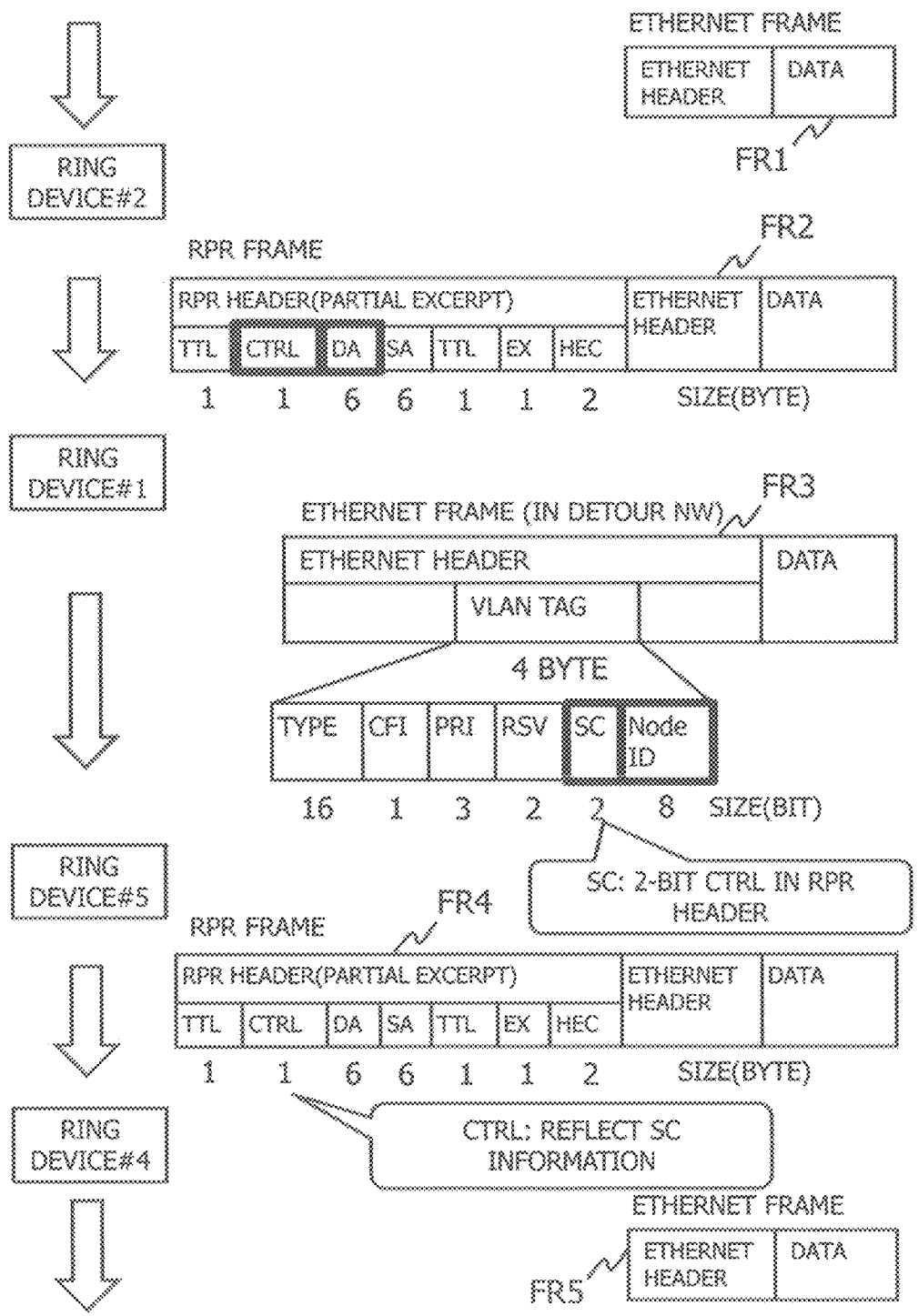
FIG. 15 is a diagram illustrating an example of transition due to frame conversion in a communication system according to a second embodiment.

FIG. 15 is a diagram illustrating an example of transition due to frame conversion in the communication system according to the second embodiment. In FIG. 15, as in FIG. 7B, an example is illustrated where, in the communication system illustrated in FIG. 7A, a frame transmitted from a terminal of a subordinate NW (Ethernet) of the ring device #2 passes through the route of the ring device #2, the ring device #1, the detour network, the ring device #5, the ring device #4, and a terminal of a subordinate NW (Ethernet) of the ring device #4.

Transition from a frame FR1 to a frame FR2 from the subordinate network of the ring device #2 to the ring device #2, and from the ring device #2 to the ring device #1 is as described in the first embodiment (FIG. 7B).

At the ring device #1, which is a boundary node, an RPR frame FR2 is converted into an Ethernet frame FR3 so as to be transferred to the detour NW. In the second embodiment, as in the first embodiment, a VLAN tag is inserted in the Ethernet frame. However, in the second embodiment, in addition to the lower 8 bits of the destination node ID, QoS information included in the header of the RPR frame is stored in the VLAN tag.

With respect to the frame FR3 in FIG. 15, the format of a VLAN tag in the second embodiment is illustrated. In the second embodiment, a field of 2 bytes (16 bits) that is used as a VLAN ID field in a normal VLAN tag is used as a node ID (8 bits), a service class (2 bits), and a reserved field (2 bits). As in the first embodiment, the lower 8 bits of the values stored in the destination node ID field (6 bytes) of the RPR frame FR2 are stored in the node ID field. In the service class field (in the drawing, SC of the frame FR3), 2 bits that are used among the values stored in the control field (in the drawing, CTRL of the frame FR2) of the RPR frame FR2 are stored. In the operation, in many cases, there are three service classes, and there are maximum five service classes according to the RPR specification. Accordingly, with the RPR frame, 1 byte is prepared for the control field, but in many cases, 2 bits are actually used, and thus, in the second embodiment, 2 bits are prepared for the service class field in the VLAN tag. However, this is not restrictive, and in the case where five service classes are used, the service class field in the VLAN tag may be set to 3 bits, and the reserved field may be set to 1 bit.

The frame FR3 is transmitted from the ring device #1, and arrives at the ring device #5 through the detour NW. At the ring device #5, the Ethernet frame FR3 is converted into an RPR frame FR4 so as to be transmitted to the RPR network. In this case, first, values of the fields of the node ID and the service class are extracted from the VLAN tag of the Ethernet frame FR3, and the VLAN tag is deleted from the frame FR3. Then, a frame FR4 is acquired by adding an RPR header to the frame, and storing the values of the node ID and the service class which have been extracted in the destination node ID field and the control field in the RPR header. At this time, padding is performed with respect to the shortage of bits of the node ID and the service class. The Ethernet frame FR3 is thereby converted at the ring device #1 into the RPR frame FR4.

Figure 16:
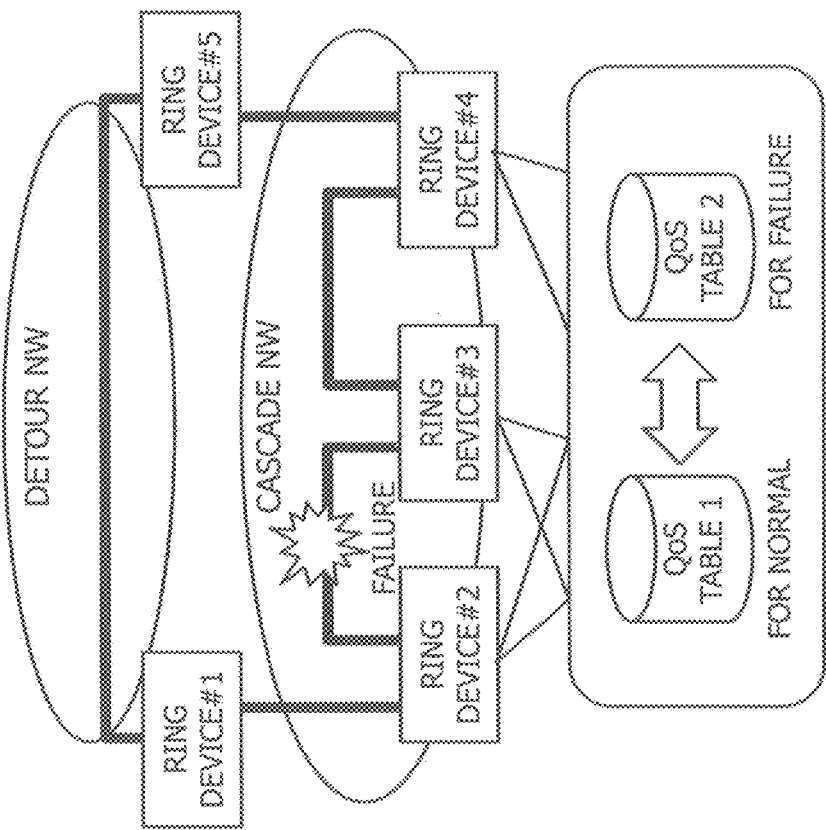
FIG. 16 is a diagram for describing an outline of the communication system of the second embodiment.

FIG. 16 is a diagram for describing an outline of the communication system of the second embodiment. RPR specifies that all the bands on the ring are the same. However, there are cases where a bandwidth narrower than that of the cascade NW (RPR) is prepared for the detour NW. In the case where the bandwidth of the detour NW is narrower than the bandwidth of the cascade NW, if QoS information of the cascade NW is used as it is, loss of data may occur in the detour NW.

According to the communication system of the second embodiment, each ring device in the RPR network holds a plurality of QoS tables for storing the QoS information, and uses different QoS tables at a normal time and at a time of occurrence of a failure.

For example, in the communication system illustrated in FIG. 16, it is assumed that the bandwidth of the cascade NW is 1000 Mbps, and the bandwidth of the detour NW is 600 Mbps. Each of the ring devices #1 to #5 includes a QoS table 1 for a normal time and a QoS table 2 for a time of failure. Information of bandwidth control according to the bandwidth 1000 Mbps of the cascade NW is set in the QoS table 1 for a normal time. Information of bandwidth control for the bandwidth 600 Mbps of the detour NW is set in the QoS table 2 for a time of failure.

At a normal time, each ring device uses the QoS table 1 for a normal time, and bandwidth control for 1000 Mbps is performed. At a normal time, since almost no frame flows to the detour NW from the cascade NW, setting for the bandwidth control may exceed the bandwidth 600 Mbps of the cascade NW.

For example, if a failure occurs in the transmission path between the ring device #2 and the ring device #3, a failure notification is issued in the cascade NW by the ring device #2 and the ring device #3. When the failure notification is received, the ring device #1 and the ring device #5, which are boundary nodes, transmit control frames and instruct the ring devices in the cascade NW to switch the QoS tables. When the control frame regarding an instruction to switch the QoS table is received, each of the ring devices #2 to #4 switches from the QoS table 1 to the QoS table 2 for a time of failure. The ring device #1 and the ring device #5, which are boundary nodes, switch from the QoS table 1 to the QoS table 2 according to transmission of the control frames regarding an instruction to switch the QoS table.

Thereby, the QoS table 2 for a time of failure is used in the event of occurrence of a failure, and bandwidth control according to the bandwidth of the detour NW is performed. Accordingly, it is possible to secure just enough data communication even when a failure has occurred.

Also, at the time of recovery from a failure, the ring device #1 and the ring device #5, which are boundary nodes, transmit control frames regarding an instruction to switch the QoS table, to the cascade NW at the timing of detection of recovery from the failure. When the control frame is received, each of the ring devices #2 to #4 switches the QoS table to be used from the QoS table 2 for a time of failure to the QoS table 1 for a normal time. The ring device #1 and the ring device #5, which are boundary nodes, switch the QoS table to be used to the QoS table 1 for a normal time according to transmission of the control frames regarding an instruction to switch the QoS table.

Additionally, switching of the QoS table to be used does not have to be based on the switching instruction regarding the QoS table using the control frame from the boundary node. For example, each of the ring devices #1 to #5 may autonomously switch the QoS table to be used based on detection of occurrence of a failure, reception of a notification regarding occurrence of a failure, detection of recovery from a failure, or the like.

<Structure of Boundary Node>

Figure 17:
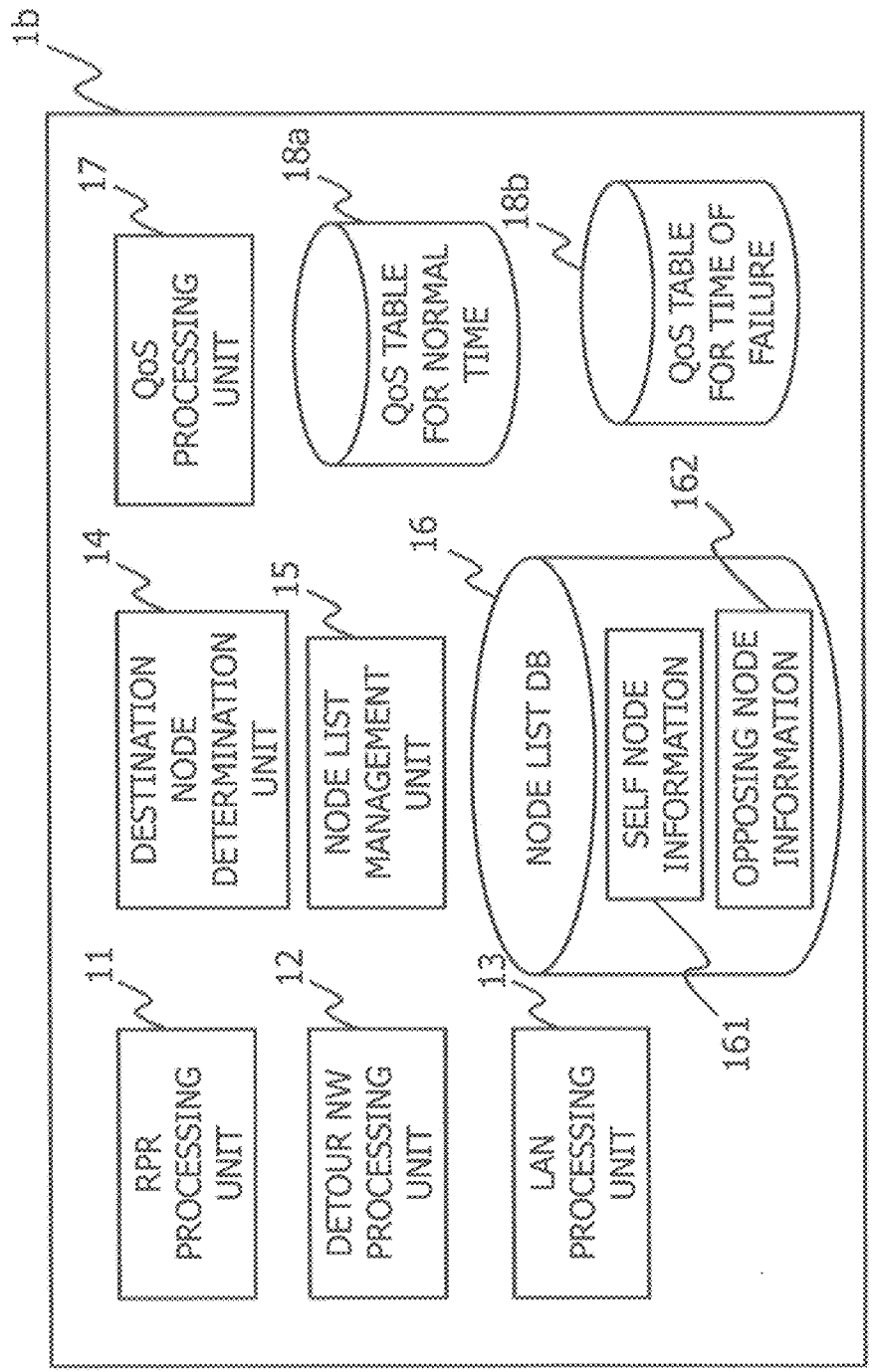
FIG. 17 is an example of functional blocks of a ring device which is a boundary node according to the second embodiment.

FIG. 17 is an example of functional blocks of a ring device 1b, according to the second embodiment, which is a boundary node. The hardware structure of the ring device 1b is the same as that of the ring device 1 of the first embodiment. The ring device 1b operates, by a processor 101 executing communication programs stored in a non-volatile memory 103, as an RPR processing unit 11, a detour NW processing unit 12, a LAN processing unit 13, a destination node determination unit 14, a node list management unit 15, and also as a QoS processing unit 17. Also, a node list DB 16, a QoS table 18a for a normal time, and a QoS table 18b for a time of failure are created in the memory area of a volatile memory 102 through installation or execution of a communication program by the processor 101. The QoS table 18a for a normal time, and the QoS table 18b for a time of failure may be set based on user input. However, this is not restrictive, and each functional block may also be achieved by hardware, by an electronic circuit such as an FPGA, or an ASIC.

The QoS processing unit 17 manages QoS information that is to be given to a frame that is to be received from a subordinate NW of the ring device 1b and be transferred to the cascade NW or the detour NW. The QoS processing unit 17 stores a QoS table to be used, and, at the time of transmission of a frame from the subordinate NW of the ring device 1b to the cascade NW or the detour NW, reads the QoS information from the QoS table that is stored, according to an inquiry from the LAN processing unit 13. The QoS information that is read is notified to the RPR processing unit 11 or the detour NW processing unit 12 depending on the transfer destination of the frame. Also, if a notification regarding occurrence of a failure is received, and if recovery from a failure is detected, the QoS processing unit 17 transmits a control frame regarding switching instruction for the QoS table to the cascade NW (from the RPR IF 111). Furthermore, the QoS processing unit 17 rewrites the QoS table to be used, that is stored therein, to the QoS table 18a for a normal time or the QoS table 18b for a time of failure, and switches the QoS table. Additionally, recovery from a failure may be detected based on update of the self node information, or by the ring devices included in the self node information and the opposing node information becoming the same due to the update of the self node information, for example.

The RPR processing unit 11 performs the following processes in addition to the processes in the first embodiment. When an RPR frame is received by the RPR IF 111, the RPR processing unit 11 analyzes the RPR frame, and extracts values from the destination node ID field and the control field. Also, in the case of transmission of an RPR frame, the RPR processing unit 11 acquires the destination node ID and the service class, and stores values in the destination node ID field and the control field in the RPR header. The destination node ID is acquired from the destination node determination unit 14. The service class is acquired based on a notification from the QoS processing unit 17 or the detour NW processing unit 12, depending on the reception interface. The RPR processing unit 11 adds the RPR header to the frame, and transmits the RPR frame from the RPR IF 111.

The detour NW processing unit 12 performs the following processes in addition to the processes in the first embodiment. When an Ethernet frame is received by the detour IF 113, the detour NW processing unit 12 analyzes the VLAN tag, and extracts values from the fields of the node ID and the service class. Also, in the case of transmission of an Ethernet frame from the detour IF 113, the detour NW processing unit 12 acquires the destination node ID and the service class, and stores the same in the VLAN tag. The destination node ID is acquired from the destination node determination unit 14. The service class is acquired based on a notification from the QoS processing unit 17 or the RPR processing unit 11. The detour NW processing unit 12 generates an Ethernet frame by including the VLAN tag in the header, and transmits the Ethernet frame from the detour IF 113.

In addition to the processes in the first embodiment, the LAN processing unit 13 inquires of the QoS processing unit 17 about the QoS information when an Ethernet frame is received by the LAN IF 112.

With respect to the destination node determination unit 14, the node list management unit 15, and the node list DB 16, the same thing as in the first embodiment can be said.

Information of bandwidth control according to the bandwidth of the cascade NW is set in the QoS table 18a for a normal time. Information of bandwidth control according to the bandwidth of the detour NW is set in the QoS table 18b for a time of failure.

<Structure of Ring Device Other than Boundary Node>

Figure 18:
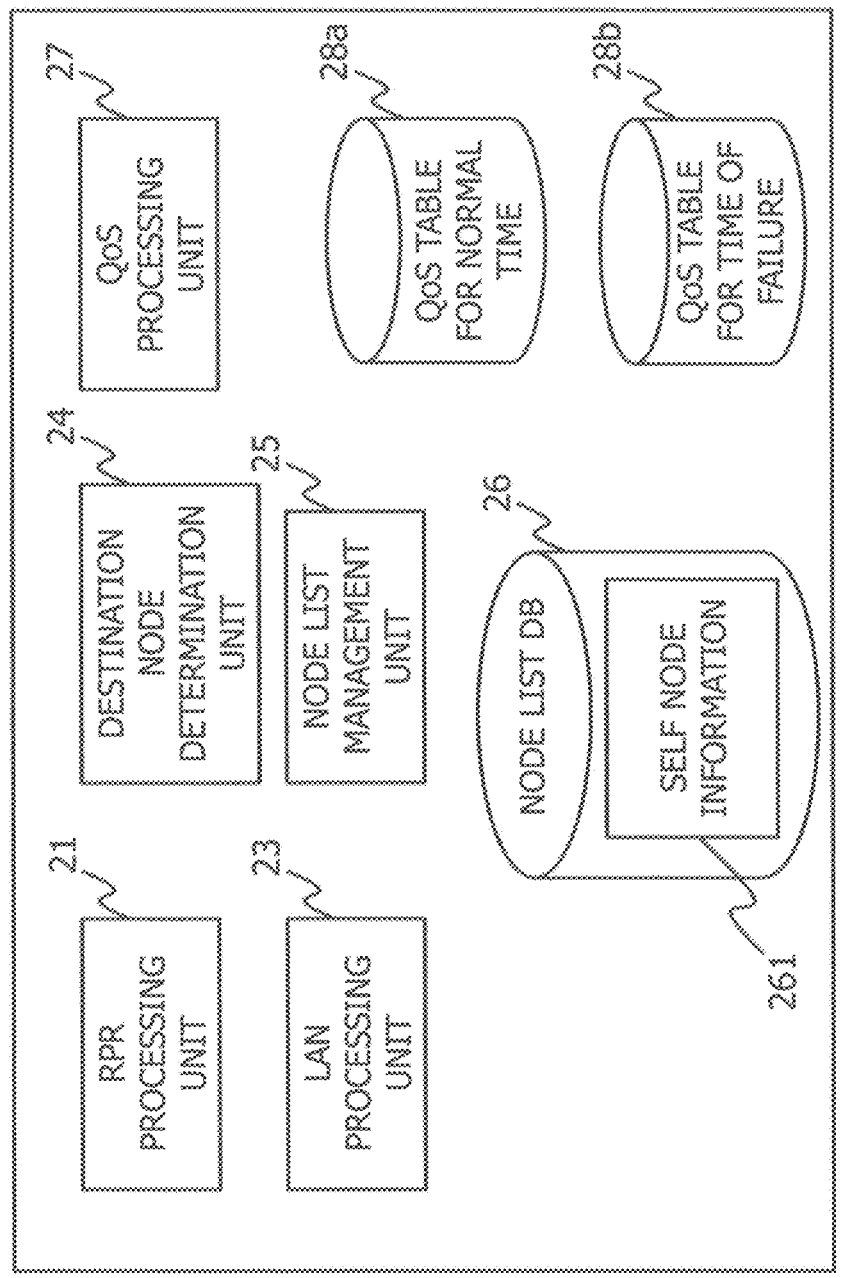
FIG. 18 is a diagram illustrating example functional blocks of a ring device which is not a boundary node.

FIG. 18 is a diagram illustrating example functional blocks of a ring device 2 which is not a boundary node. The hardware structure of the ring device 2 is the same as that of the ring device 1b, which is a boundary node, and is as illustrated in FIG. 8. The ring device 2 operates, by a processor 101 executing communication programs stored in a non-volatile memory 103, as an RPR processing unit 21, a LAN processing unit 23, a destination node determination unit 24, a node list management unit 25, and a QoS processing unit 27. Also, a node list DB 26, a QoS table 28a for a normal time, and a QoS table 28b for a time of failure are created in the memory area of a volatile memory 102 through installation or execution of the communication programs. The QoS table 28a for a normal time, and the QoS table 28b for a time of failure may be set based on user input.

Self node information 261 is stored in the node list DB 26. Since the ring device 2, which is not a boundary node, is not connected to the detour NW, and does not perceive the detour NW, the ring device 2 does not include the opposing node information. Information of bandwidth control according to the bandwidth of the cascade NW is set in the QoS table 28a for a normal time. Information of bandwidth control according to the bandwidth of the detour NW is set in the QoS table 28b for a time of failure.

The ring device 2 other than a boundary node performs approximately the same processes as the ring device 1b, which is a boundary node, except that the ring device 2 is connected to the RPR network and a subordinate Ethernet network, and does not perform processes related to the detour NW. The RPR processing unit 21 performs a process on a frame that is to be transmitted/received by the RPR IF 111. Accordingly, the processes of the RPR processing unit 21 and the LAN processing unit 23 are the same as the processes of the RPR processing unit 11, and the LAN processing unit 13 of the ring device 1b, which is a boundary node. Since the ring device 2 other than a boundary node does not include the opposing node information, the destination node determination unit 24, and the node list management unit 25 perform the same processes as the destination node determination unit 14, and the node list management unit 15 of the ring device 1b, which is a boundary node, except that the destination node determination unit 24, and the node list management unit 25 do not perform processes related to an opposing node.

The QoS processing unit 27 manages QoS information that is to be received from the subordinate NW of the ring device 2 and that is to be given to a frame to be transferred to the cascade NW. The QoS processing unit 27 stores a QoS table to be used, and, at the time of transmission of a frame from the subordinate NW of the ring device 2 to the cascade NW, reads the QoS information from the QoS table that is stored to be used, according to an inquiry from the LAN processing unit 23. The QoS information that is read is notified to the RPR processing unit 21. Also, when a control frame regarding switching instruction for the QoS table is received from the ring device 1b, which is a boundary node, the QoS processing unit 27 rewrites the QoS table to be used to the QoS table 28a for a normal time or the QoS table 28b for a time of failure, and switches the QoS table.

<Example Operation of Boundary Node>

Figure 19:
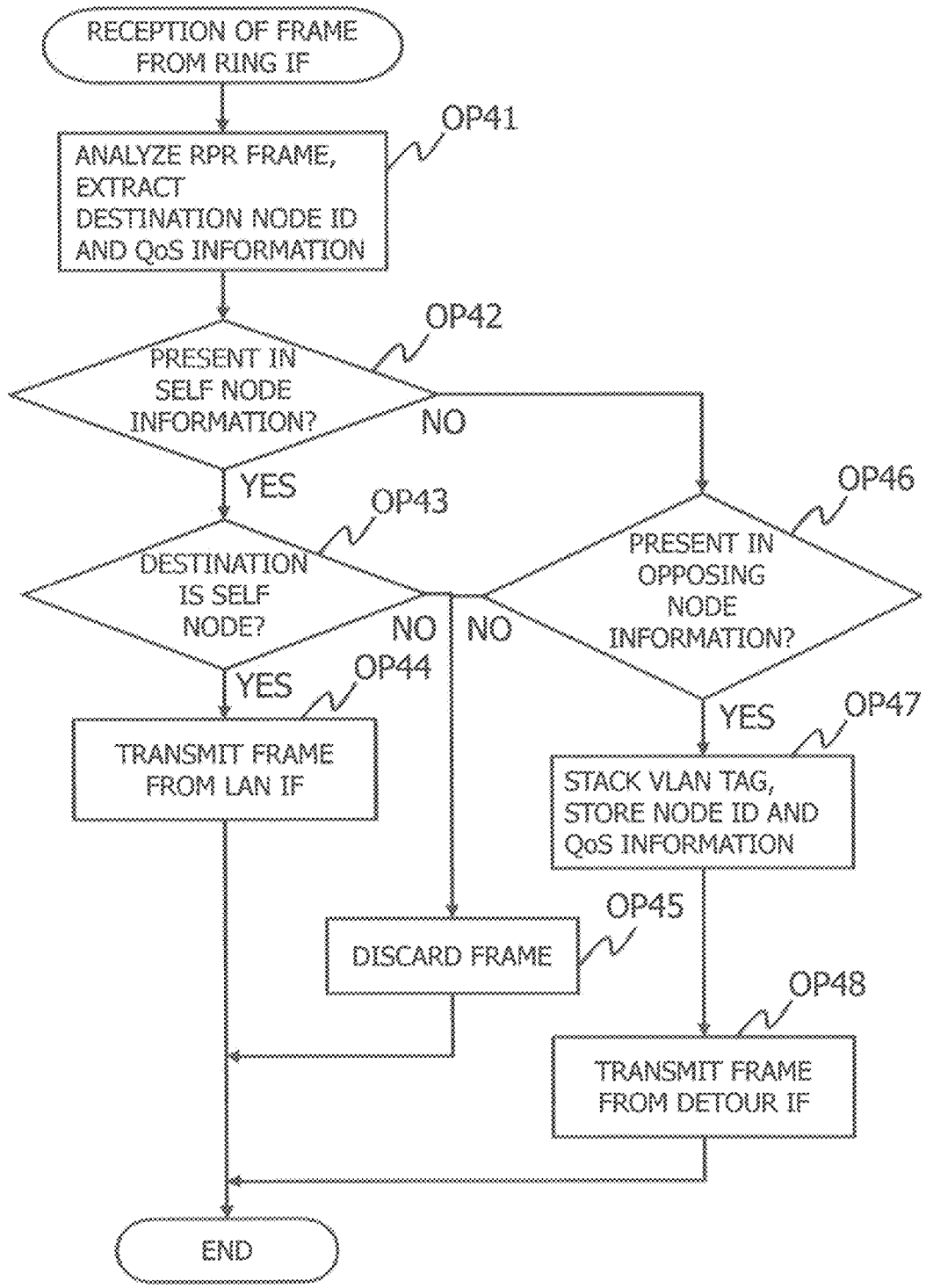
FIG. 19 is an example of a flow chart of a frame transfer process of the ring device which is a boundary node for a case where a frame is received by an RPR IF where there is occurrence of a failure in a cascade NW.
Figure 20:
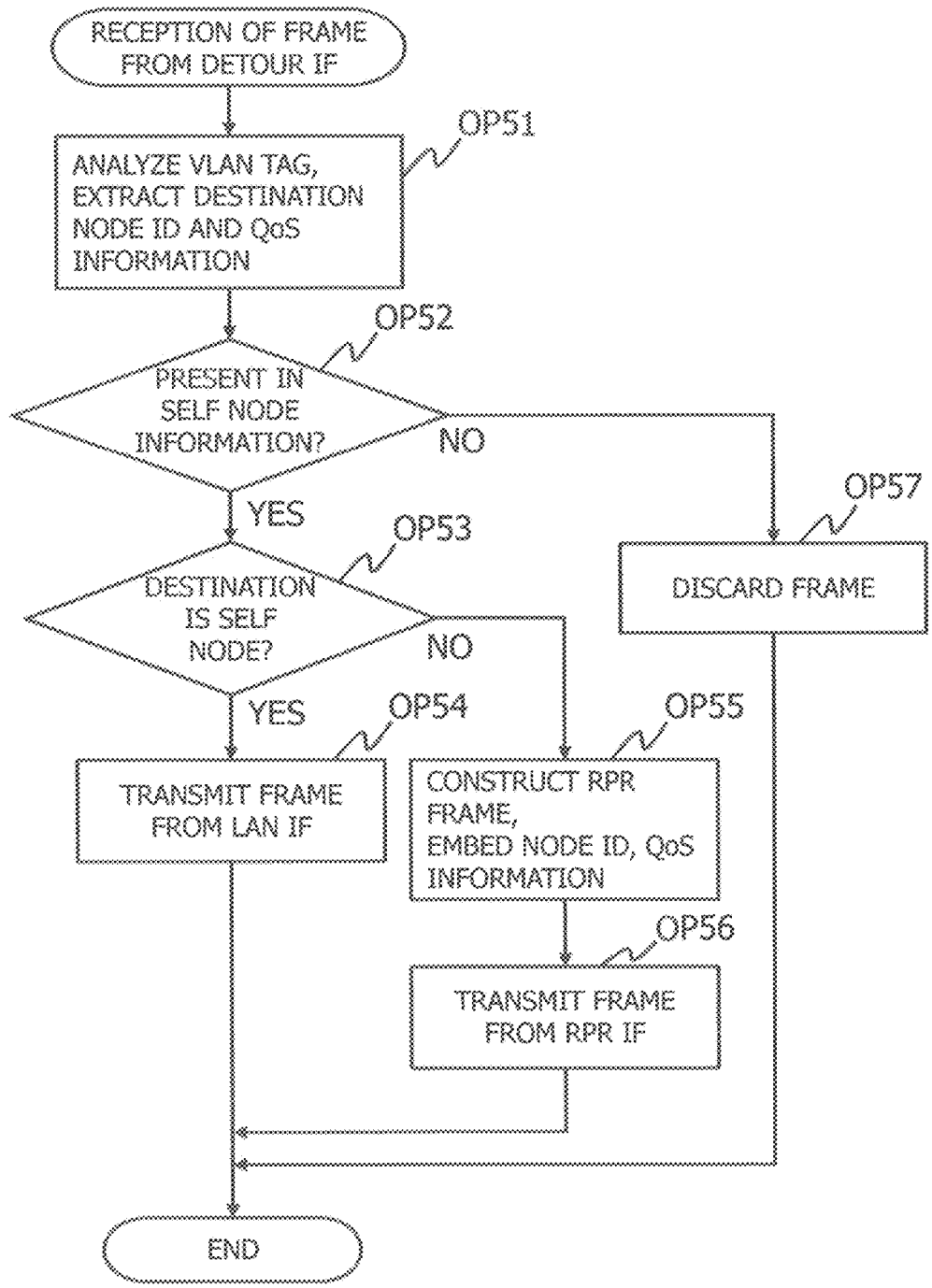
FIG. 20 is an example of a flow chart of a frame transfer process of the ring device which is a boundary node for a case where a frame is received by a detour IF where there is occurrence of a failure in a cascade NW.
Figure 21:
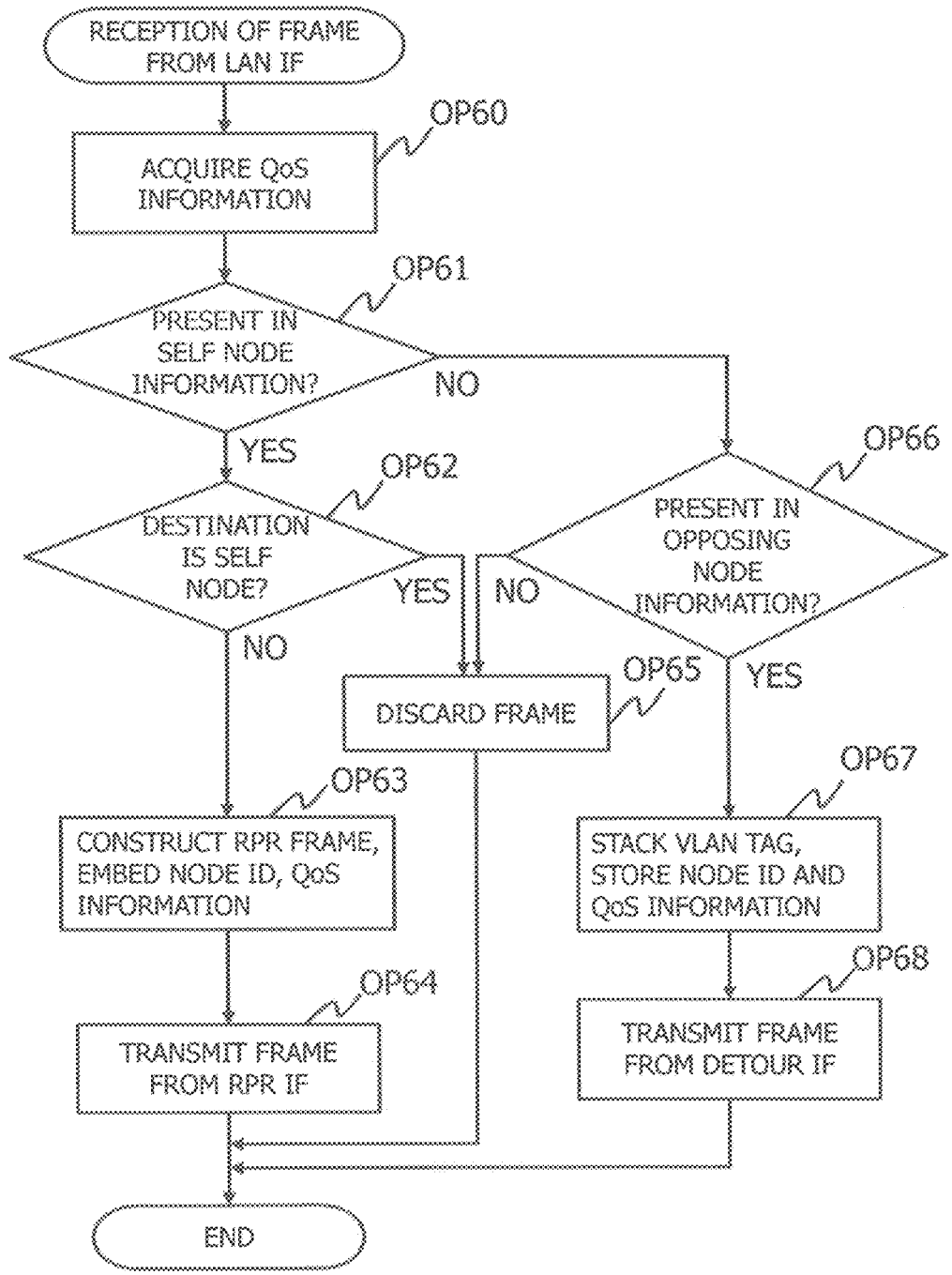
FIG. 21 is an example of a flow chart of a frame transfer process of the ring device which is a boundary node for a case where a frame is received by a LAN IF.

FIGS. 19, 20, and 21 are each an example of a flow chart of a frame transfer process of the ring device 1b, which is a boundary node, for a case where there is occurrence of a failure in the cascade NW.

FIG. 19 is an example of a flow chart of a frame transfer process of the ring device 1b, which is a boundary node, for a case where a frame is received by the RPR IF 111 where there is occurrence of a failure in a cascade NW. The flow chart illustrated in FIG. 19 is started when a frame is received by the RPR IF 111 where there is occurrence of a failure in the cascade NW.

In the flow chart illustrated in FIG. 19, the processes in OP42 to OP46, and OP48 are the same as the processes in OP12 to OP16, and OP18 of the flow chart illustrated in FIG. 11. In the following, the processes in OP41 and OP47 that are different from those in the flow chart illustrated in FIG. 11 will be described.

In OP41, the processor 101 analyzes an RPR frame received by the RPR IF 111, and extracts values stored in the destination node ID field and the control field in the RPR header. Also, the processor 101 deletes the header of the RPR frame. The frame at this time is a normal Ethernet frame (see FIG. 7B).

In OP47, it is determined that the frame received by the RPR IF 111 is to be transmitted to the detour NW, and the processor 101 inserts the VLAN tag in a predetermined position in the Ethernet header of the frame from which the RPR header has been removed in OP41. The lower 8 bits of the destination node ID extracted in OP41 are stored in the node ID field of the VLAN tag. Also, 2 bits that are used among the values stored in the control field of the RPR header extracted in OP41 are stored in the service class field of the VLAN tag.

FIG. 20 is an example of a flow chart of a frame transfer process of the ring device 1b, which is a boundary node, for a case where a frame is received by the detour IF 113 where there is occurrence of a failure in the cascade NW. The flow chart illustrated in FIG. 20 is started when a frame is received by the detour IF 113 where there is occurrence of a failure in the cascade NW. Additionally, the frame to be received by the detour IF 113 is an Ethernet frame including a VLAN tag.

In the flow chart illustrated in FIG. 20, the processes in OP52 to OP54, OP56, and OP57 are the same as the processes in OP22 to OP24, OP26, and P27 of the flow chart illustrated in FIG. 12. In the following, the processes in OP51 and OP55 that are different from the processes in the flow chart illustrated in FIG. 12 will be described.

In OP51, the processor 101 analyzes an Ethernet frame received by the detour IF 113 from the detour NW, and extracts an 8-bit value from the node ID field of the VLAN tag. Also, the processor 101 extracts a 2-bit value from the service class field of the VLAN tag. The processor 101 deletes the VLAN tag from the Ethernet frame.

In OP55, it is determined that the Ethernet frame received by the detour IF 113 is to be transmitted to the RPR network, and the processor 101 generates an RPR frame by adding an RPR header to the Ethernet frame (see FIG. 7B, the frames FR3 and FR4). The processor 101 stores, in the destination node ID field of the RPR frame, a 6-byte value obtained by performing padding on the 8-bit value of the node ID field of the VLAN tag extracted in OP21. Also, the processor 101 stores, in the control field of the RPR frame, a 1-byte value obtained by performing padding on the 2-bit value of the service class field of the VLAN tag extracted in OP21.

FIG. 21 is an example of a flow chart of a frame transfer process of the ring device 1b, which is a boundary node, where a frame is received by the LAN IF 112. The flow chart illustrated in FIG. 21 is started when a frame is received by the LAN IF 112.

In the flow chart illustrated in FIG. 21, the processes in OP61, OP62, OP64 to OP66, and OP68 are the same as the processes in OP31, OP32, OP34 to OP36, and OP38 of the flow chart illustrated in FIG. 13. In the following, the processes in OP60, OP63, and OP67 that are different from the processes of the flow chart illustrated in FIG. 12 will be described.

In OP60, the processor 101 acquires QoS information from a QoS table that is being used. Additionally, the QoS table 18a for a normal time is used when the cascade NW is normal. The QoS table 18b for a time of failure is used when there is a failure in the cascade NW.

In OP63, it is determined that an Ethernet frame received by the LAN IF 112 is to be transferred to the cascade NW (RPR), and the processor 101 generates an RPR frame by adding an RPR header to the Ethernet frame (see FIG. 7B, the frames FR1 and FR2). The processor 101 stores, in the destination node ID field of the RPR frame, a destination node ID that is acquired based on the association between the subordinate NW and the node ID. Also, the processor 101 stores, in the control field of the RPR frame, the service class specified by the QoS information acquired in OP60. This frame is transmitted from the RPR IF 111 to the cascade NW (RPR).

In OP67, it is determined that the Ethernet frame received by the LAN IF 112 is to be transferred to the detour NW (Ethernet), and the processor 101 inserts a VLAN tag in a predetermined position of the Ethernet frame. The processor 101 stores, in the node ID field of the VLAN tag, the lower 8 bits of the destination node ID acquired based on the association between the subordinate NW and the node ID. Also, the processor 101 stores, in the service class field of the VLAN tag, the service class specified by the QoS information acquired in OP60. This frame is transmitted from the detour IF 113 to the detour NW (Ethernet).

<Effect of Second Embodiment>

In the second embodiment, in the case of transferring a frame to the detour NW (Ethernet), the ring device 1b, which is a boundary node, embeds QoS information in the cascade NW (RPR) in the Ethernet frame by storing the QoS information in the VLAN tag. The QoS information of the cascade NW may thereby be prevented from being lost even when passing through the detour NW.

Also, in the second embodiment, a ring device in the cascade NW uses different QoS tables at a normal time and at a time of occurrence of a failure in the cascade NW. Accordingly, at a time of failure in the cascade NW, bandwidth control according to the detour NW with narrower bandwidth than the cascade NW is performed, and loss of data may be prevented.

<Example Modification of Second Embodiment>

Figure 22:
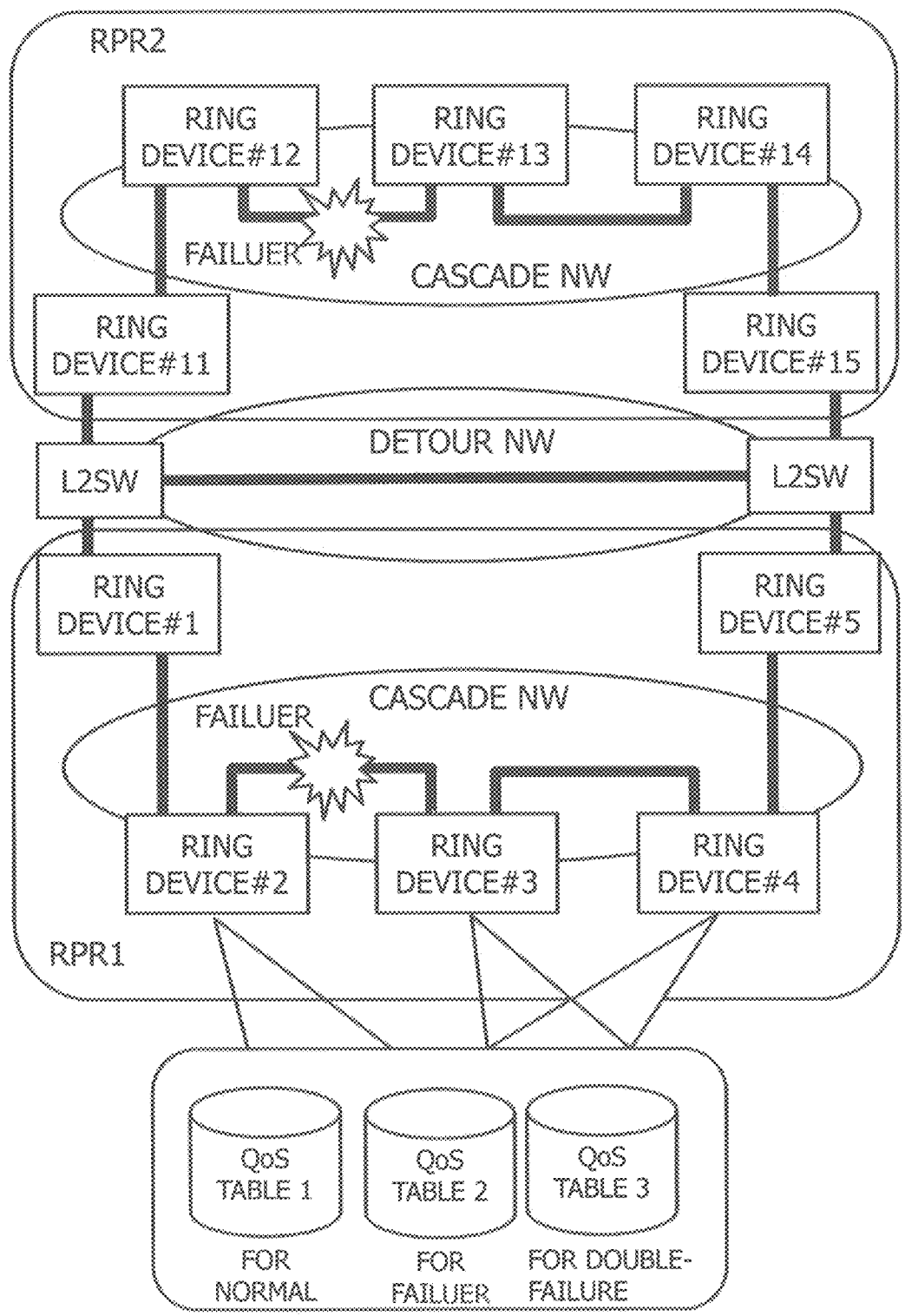
FIG. 22 is an example where a detour NW is shared by two RPR networks of an RPR1 and an RPR2.

FIG. 22 illustrates an example where the detour NW is shared by two RPR networks of an RPR1 and an RPR2. In the detour NW, ring devices #1 and #5 which are boundary nodes of the RPR1 and ring devices #11 and #15 which are boundary nodes of the RPR2 are connected through layer 2 switches, respectively.

Occurrence of a failure in both the RPR1 and the RPR2 is referred to as double-failure. In the event of double-failure, both the RPR1 and the RPR2 use the detour NW, and thus there is a pressure on the bandwidth of the detour NW. Accordingly, according to the example modification of the second embodiment, each ring device includes, and uses depending on the situation, a QoS table 3 for a time of double-failure, in addition to the QoS table 1 for a normal time and the QoS table 2 for a time of failure.

For example, it is assumed that the bandwidths of the cascade NWs of the RPR1 and the RPR2 are 1000 Mbps, and the bandwidth of the detour NW is 600 Mbps. In this case, setting for bandwidth control according to the bandwidth 1000 Mbps of the cascade NW is stored in the QoS table 1 for a normal time. For example, setting for bandwidth control according to the bandwidth 600 Mbps of the detour NW is set in the QoS table 2 for a time of failure. Also, for example, setting for bandwidth control according to a bandwidth that may be used at a time of double-failure, for example, half the bandwidth of the detour NW, i.e. 300 Mbps, is set in the QoS table 3 for a time of double-failure.

In the following, the RPR1 will be described, but the same structure may be applied to the RPR2. The ring device #1 and the ring device #5, which are boundary nodes, detect occurrence of a double-failure by detecting a delay or a loss of a frame through the detour NW, for example. For example, control frames for transmitting copies of the self node information to the opposing nodes are exchanged through the detour NW at predetermined intervals, and thus, the boundary nodes detect the double-failure by monitoring the reception intervals or the like of the control frames.

When a double-failure is detected, the ring devices #1 and #5, which are boundary nodes, notify the ring devices #2 to #4 in the cascade NW of occurrence of the double-failure by using control frames. When the notifications regarding occurrence of double-failure are received, the ring devices #2 to #4 switch the QoS tables to be used to the QoS tables 3 for a time of double-failure. The ring devices #1 and #5, which are boundary nodes, switch the QoS tables to be used to the QoS tables 3 for a time of double-failure after transmitting control frames for notifying of the double-failure.

By each ring device including a QoS table for a time of double-failure, and using the QoS table for a time of double-failure in the event of occurrence of a double-failure, bandwidth control that flexibly copes with a double-failure where the detour NW is shared by a plurality of cascade NWs may be performed.

All examples and conditional language provided herein are intended for the pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiment(s) of the present invention have been described in detail, it should be understood that the various changes, substitutions, and alterations could be made hereto without departing from the spirit and scope of the invention.

What is claimed is:

1. A communication device connected to an end of a first network of a cascade topology, and also to a second network with a frame format different from the first network, the communication device comprising:

a transmitter that transmits a first list to an opposing communication device, wherein the first list includes information of a first set of one or more communication devices in the first network, wherein the first set of one or more communication devices is one or more destinations of transmission of frames from the communication device through the first network, and wherein the opposing communication device is connected to the second network, and located at another end of the first network;

a receiver that receives a second list from the opposing communication device, wherein the second list includes information of a second set of one or more communication devices in the first network, and wherein the second set of one or more communication devices is one or more destinations of transmission of frames from the opposing communication device through the first network;

a storage that stores the first list and the second list;

a controller that determines in which of the first list and the second list a destination of a frame is included; and a frame transmitter that transmits, in a case where a destination of a frame received from the first network is included in the second list, the frame to the second network, wherein the frame transmitter converts a frame received from the first network from a format used in the first network to a format used in the second network, and in the conversion, embeds information of a destination node of the frame in a position different from a field for storing destination information, wherein the position and the field for storing the destination information are in a header of the formal used in the second network.

2. The communication device according to claim 1, wherein when a failure has occurred in the first network, the determiner searches the first list and the second list for the destination of the frame.

3. The communication device according to claim 1, further comprising:

a second frame transmitter that converts, when a destination of a frame received from the second network is included in the first list, the frame from the format used in the second network to the format used in the first network, stores, in the conversion, the information of a destination node of the frame in destination information in a header of the format used in the first network, wherein the information of the destination node of the frame is embedded in the position different from the field for storing destination information, and wherein the position and the field for storing destination information are in the header of the format used in the second network, and transmits the frame to the first network.

4. The communication device according to claim 1, wherein, in the conversion, the frame transmitter embeds Quality of Service (QoS) information in the header of the format used in the first network, in a position different from a field for storing QoS information, wherein the position and the field for storing the QoS information are in the header of the format used in the second network.

5. The communication device according to claim 4, further comprising:
   a second storage that stores QoS setting information for a normal time of the first network and QoS setting information for a time of occurrence of a failure in the first network; and
   a QoS manager that switches, at a time of occurrence of a failure in the first network, QoS setting information to be used to the QoS setting information for a time of occurrence of a failure in the first network.

6. The communication device according to claim 5, wherein the second storage further stores QoS setting information for a time of occurrence of a failure in a third network of a cascade topology and the first network, wherein the third network is connected to the second network, and wherein the QoS manager switches, at a time of occurrence of a failure in both the first network and the third network, QoS setting information to be used to the QoS setting information for a time of occurrence of a failure in both the first network and the third network.

7. The communication device according to claim 1, further comprising:
   a notifier that notifies the first set of one or more communication devices or the second set of one or more communication devices in the first network, of switching to QoS setting information that corresponds to a failure, at a time of occurrence of a failure in the first network, wherein the one or more communication devices in the first network stores QoS setting information that corresponds to normal operation of the first network and the QoS setting information that corresponds to occurrence of a failure in the first network, a notifier that notifies one or more communication devices in the first network, of switching to QoS setting information for a time of occurrence of a failure at a time of occurrence of a failure in the first network, wherein the one or more communication devices in the first network stores QoS setting information for a normal time of the first network and the QoS setting information for a time of occurrence of a failure in the first network.

8. The communication device according to claim 7, wherein a third network of a cascade topology is connected to the second network, wherein the communication device in the first network further includes QoS setting information for a time of occurrence of a failure in both the first network and the third network, and wherein at a time of occurrence of a failure in both the first network and the third network, the notifier notifies the communication device in the first network of switching to the QoS setting information for a time of occurrence of a failure in both the first network and the third network.

9. The communication device according to claim 1, wherein the first network is an Resilient Packet Ring (RPR) network, wherein the second network is an Ethernet network, and wherein, in the conversion, the frame transmitter inserts a Virtual Local Area Network (VLAN) tag in an Ethernet header, and stores, in the VLAN tag, destination node information in an RPR header of the frame.

10. A communication method to be performed by a communication device connected to an end of a first network of a cascade topology, and also to a second network with a frame format different from the first network, the method comprising:
   transmitting a first list to an opposing communication device, wherein the first list includes information of a first set of one or more communication devices in the first network, wherein the first set of one or more communication devices is one or more destinations of transmission of frames from the communication device through the first network, and wherein the opposing communication device is connected to the second network, and located at another end of the first network;
   receiving a second list from the opposing communication device, wherein the second list includes information of a second set of one or more communication devices in the first network, and wherein the second set of one or more communication devices is one or more destinations of transmission of frames from the opposing communication device through the first network;
   storing the first list and the second list;
   determining in which of the first list and the second list a destination of a frame is included; and
   transmitting, in a case where a destination of a frame received from the first network is included in the second list, the frame to the second network,
   wherein the transmitting converts a frame received from the first network from a format used in the first network to a format used in the second network, and in the conversion, embeds information of a destination node of the frame in a position different from a field for storing destination information, wherein the position and the field for storing the destination information are in a header of the formal used in the second network.

11. A non-transitory computer-readable recording medium recording a communication program for causing a communication device connected to an end of a first network of a cascade topology, and also to a second network with a frame format different from the first network to execute a process comprising:
   transmitting a first list to an opposing communication device, wherein the first list includes information of a first set of one or more communication devices in the first network, wherein the first set of one or more communication devices is destinations of transmission of frames from the communication device through the first network, and wherein the opposing communication device is connected to the second network, and located at another end of the first network;
   receiving a second list from the opposing communication device, wherein the second list includes information of a second set of one or more communication devices in the first network, and wherein the second set of one or more communication devices is destinations of transmission of frames from the opposing communication device through the first network;
   storing the first list and the second list;
   determining in which of the first list and the second list a destination of a frame is included; and transmitting, in a case where a destination of a frame received from the first network is included in the second list, the frame to the second network, wherein the transmitting converts a frame received from the first network from a format used in the first network to a format used in the second network, and in the conversion, embeds information of a destination node of the frame in a position different from a field for storing destination information, wherein the position and the field for storing the destination information are in a header of the formal used in the second network.

* * * * *